(12) United States Patent
Bensley et al.

(10) Patent No.: US 10,467,924 B2
(45) Date of Patent: Nov. 5, 2019

(54) BEHAVIORAL INTELLIGENCE FRAMEWORK, CONTENT MANAGEMENT SYSTEM, AND TOOL FOR CONSTRUCTING SAME

(71) Applicant: WESTERN MICHIGAN UNIVERSITY RESEARCH FOUNDATION, Kalamazoo, MI (US)

(72) Inventors: Robert J. Bensley, Schoolcraft, MI (US); Jason Rivas, Bastrop, TX (US); John J. Brusk, Chamblee, GA (US)

(73) Assignee: WESTERN MICHIGAN UNIVERSITY RESEARCH FOUNDATION, Kalamazoo, MI (US)

( * ) Notice: Subject to any disclaimer, the term of this patent is extended or adjusted under 35 U.S.C. 154(b) by 365 days.

(21) Appl. No.: 14/386,411

(22) PCT Filed: Sep. 20, 2013

(86) PCT No.: PCT/US2013/060899
§ 371 (c)(1),
(2) Date: Sep. 19, 2014

(87) PCT Pub. No.: WO2015/041675
PCT Pub. Date: Mar. 26, 2015

(65) Prior Publication Data
US 2016/0240097 A1 Aug. 18, 2016

(51) Int. Cl.
*G09B 19/00* (2006.01)
*G09B 7/07* (2006.01)
*G09B 5/08* (2006.01)

(52) U.S. Cl.
CPC ............. *G09B 19/00* (2013.01); *G09B 5/08* (2013.01); *G09B 7/07* (2013.01); *G09B 19/0092* (2013.01)

(58) Field of Classification Search
CPC ... G09B 7/00; G09B 7/02; G09B 7/04; G09B 19/00; G09B 7/07; G09B 7/06; G09B 5/08; G09B 19/0092; G06Q 10/101
(Continued)

(56) References Cited

U.S. PATENT DOCUMENTS 5,059,127 A * 10/1991 Lewis ................... G09B 7/00
434/236
6,144,838 A * 11/2000 Sheehan ................ G09B 7/02
434/118
(Continued)

FOREIGN PATENT DOCUMENTS

WO WO-00-57976 A1 10/2000

OTHER PUBLICATIONS

International Search Report and Written Opinion for PCT/US2013/060899, dated Feb. 21, 2014; ISA/US.

*Primary Examiner* — Jack Yip
(74) *Attorney, Agent, or Firm* — Harness, Dickey & Pierce, P.L.C.; Timothy D. MacIntyre

(57) ABSTRACT

A computer-implemented tool having a collection of content management subsystems allows the content creator to construct a web-based behavioral modification site without the need for computer programming skills. The content delivery system constructed with this tool employs a lesson manager that delivers lesson content based on a tree structure; a virtual educator manager that presents different graphical images of an educator character, complete with different facial expressions and gestures designed to facilitate learning; a link manager that supplements lesson content with links to supplemental material and automatically suppresses dead links; and an impact manager that automatically administers a stage-of-change questionnaire a predefined time interval after the lesson was completed.

17 Claims, 32 Drawing Sheets

(58) Field of Classification Search
USPC .......................................................... 434/236
See application file for complete search history.

(56) References Cited

U.S. PATENT DOCUMENTS

| | | | | |
|---|---|---|---|---|
| 6,260,033 | B1* | 7/2001 | Tatsuoka | G01R 31/318371 |
| | | | | 434/322 |
| 7,433,832 | B1* | 10/2008 | Bezos | G06Q 10/10 |
| | | | | 705/26.8 |
| 2004/0015337 | A1 | 1/2004 | Thomas et al. | |
| 2004/0024777 | A1 | 2/2004 | Schaffer | |
| 2005/0026131 | A1* | 2/2005 | Elzinga | G09B 7/00 |
| | | | | 434/365 |
| 2007/0020604 | A1* | 1/2007 | Chulet | G09B 5/06 |
| | | | | 434/350 |
| 2009/0070426 | A1* | 3/2009 | McCauley | G06Q 10/10 |
| | | | | 709/205 |
| 2010/0028846 | A1 | 2/2010 | Cohen et al. | |
| 2010/0275164 | A1* | 10/2010 | Morikawa | G11B 19/025 |
| | | | | 715/838 |
| 2011/0065082 | A1* | 3/2011 | Gal | G09B 7/02 |
| | | | | 434/365 |
| 2011/0252109 | A1 | 10/2011 | Steele | |
| 2013/0031100 | A1* | 1/2013 | Graham | G06F 16/438 |
| | | | | 707/739 |
| 2013/0090749 | A1 | 4/2013 | Oswald et al. | |
| 2013/0285909 | A1* | 10/2013 | Patel | G09B 5/00 |
| | | | | 345/158 |
| 2014/0279727 | A1* | 9/2014 | Baraniuk | G06N 20/00 |
| | | | | 706/11 |

* cited by examiner

BEHAVIORAL INTELLIGENCE FRAMEWORK, CONTENT MANAGEMENT SYSTEM, AND TOOL FOR CONSTRUCTING SAME

FIELD

The present disclosure relates generally to computer-implemented expert systems, educational systems and computer-implemented tools for constructing these systems. More particularly, the disclosure relates to computer-implemented systems for effecting behavior modification through online interaction with a computer-implemented virtual educator.

BACKGROUND

This section provides background information related to the present disclosure which is not necessarily prior art.

With the cost of healthcare skyrocketing, the medical profession has increasingly come to recognize the importance of preventative medicine. Thus, throughout the country, professionally-staffed behavioral modification clinics are growing in number. In addition, some employers are also hosting at-work programs to help their employees make beneficial behavioral modifications to their lives: stop smoking, lose weight, exercise regularly, and the like. Supplementing these professionally led clinics and at-work seminars, a number of doctors and health and fitness educators have written books that are designed to teach the fundamentals of self-improvement through behavioral change.

Unfortunately, while these are all laudatory efforts, human nature seems quite resistant to change. The New York Times in a feature article "Pumping Up the Self-Control in the Age of Temptations" published Oct. 8, 2010, reported that some believe a person has only a limited supply of willpower and recommend using it wisely.

Indeed, it is human nature to lapse into old habits shortly after each New Year's resolution. Thus behavioral educators and counselors offering one-on-one guidance play a very important role. Professional educators and counselors can actively monitor their client's progress, offering encouragement when needed, while guiding the client along a new path that, with practice, replaces old habits leaving the client or consumer with a healthier lifestyle.

The problem is, behavioral educators and counselors are in short supply. To leverage the most talented educators some have proposed that Internet-based websites could be used to provide written teaching materials and video training sessions that can be watched online. While such websites work reasonably well at disseminating basic information, they generally fail as behavioral modification tools, again because of human nature and the complexity of the issues that surround it. It seems these web-based resources are no substitute for the encouragement and monitoring and basic nurturing that can be provided by professional educators and counselors in a one-on-one relationship with their clients.

SUMMARY

This section provides a general summary of the disclosure, and is not a comprehensive disclosure of its full scope or all of its features.

The present disclosure describes a new form of behavioral modification system that leverages the educator or counselor far more effectively than traditional online resources have been able to offer. The system can be used in a wide variety of different behavioral modification applications, including but not limited to medical or health-related applications, such as managing diabetes, heart disease, obesity, high blood pressure, high cholesterol, and the like.

The behavioral modification system employs a computer-implemented expert system based on five key principles. These principles are: (1) recreate the human experience, (2) personalize to the individual, (3) create a dynamic experience, (4) provide a supportive environment, and (5) build upon sound theory.

To achieve its goals, the behavioral modification system implements a behavioral intelligence content management system that includes a computer-implemented tool for building a backend content management system for an interactive, computer-implemented behavior change-based lesson delivery system. The computer-implemented tool is designed with recognition of the fact that the skilled behavioral modification specialist may have little or no experience in computer programming or website development, and may not have ready access to persons who do. Thus, the computer-implemented tool allows the behavioral modification specialist to construct a lesson delivery system without needing to learn how to program computers or design websites.

The computer-implemented tool has an interface implemented by a processor programmed to receive input from the user, such as from a person with expertise in the domain being taught (e.g., behavioral modification specialist). The tool further includes a lesson manager, implemented by the processor, which generates a decision tree structure and populates that structure with lesson content, comprising a plurality of lesson pages stored in memory. The tool further includes a virtual educator manager, implemented by the processor, which stores in memory a plurality of different graphical images of a virtual educator character. Each image corresponds to a different facial expression or gesture associated with the tone of feedback being provided to the user. The virtual education manager is further programmed to respond, based on input received by the user creating the lessons, by associating and storing in memory a selected one of the different graphical images with selected ones of the lesson pages.

The tool further includes a link manager, implemented by the processor, which stores a plurality of links autonomously from the lessons. The links correspond to second, skill-specific content and resources that supplement the lesson content. The link manager is programmed to respond, based on input received from the user designing the lessons, to define a conditional reference between a lesson page and the second content. This conditional reference is tested at run time (when the client interacts with the lesson content) whether the referenced second content is available. The link manager suppresses the link if it is not available at run time; thus, the client or consumer is not prompted to follow links that are dead.

The tool further includes an impact manager implemented by a processor, which stores a record when the lesson was completed by the client during run time. The impact manager is programmed to compute a predefined interval after the stored date, representing a later date on which to issue a stage-of-change impact questionnaire. Thus, the impact manager automatically generates impact questionnaires that measure the client's stage of change at a predefined interval after the particular lesson was completed. The impact questionnaire thus tests, not the clients overall comprehension of the material but rather whether the client has progressed toward active change or lapsed into old behavior following a predetermined time after the lesson was completed. Clients receive additional second content to assist in continuing to progress toward change based on the previous lesson.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 21 is an exemplary screen from the virtual educator manager as generated by the tool;

FIG. 23 is an exemplary impact report produced by the impact manager;

Figure 30A:
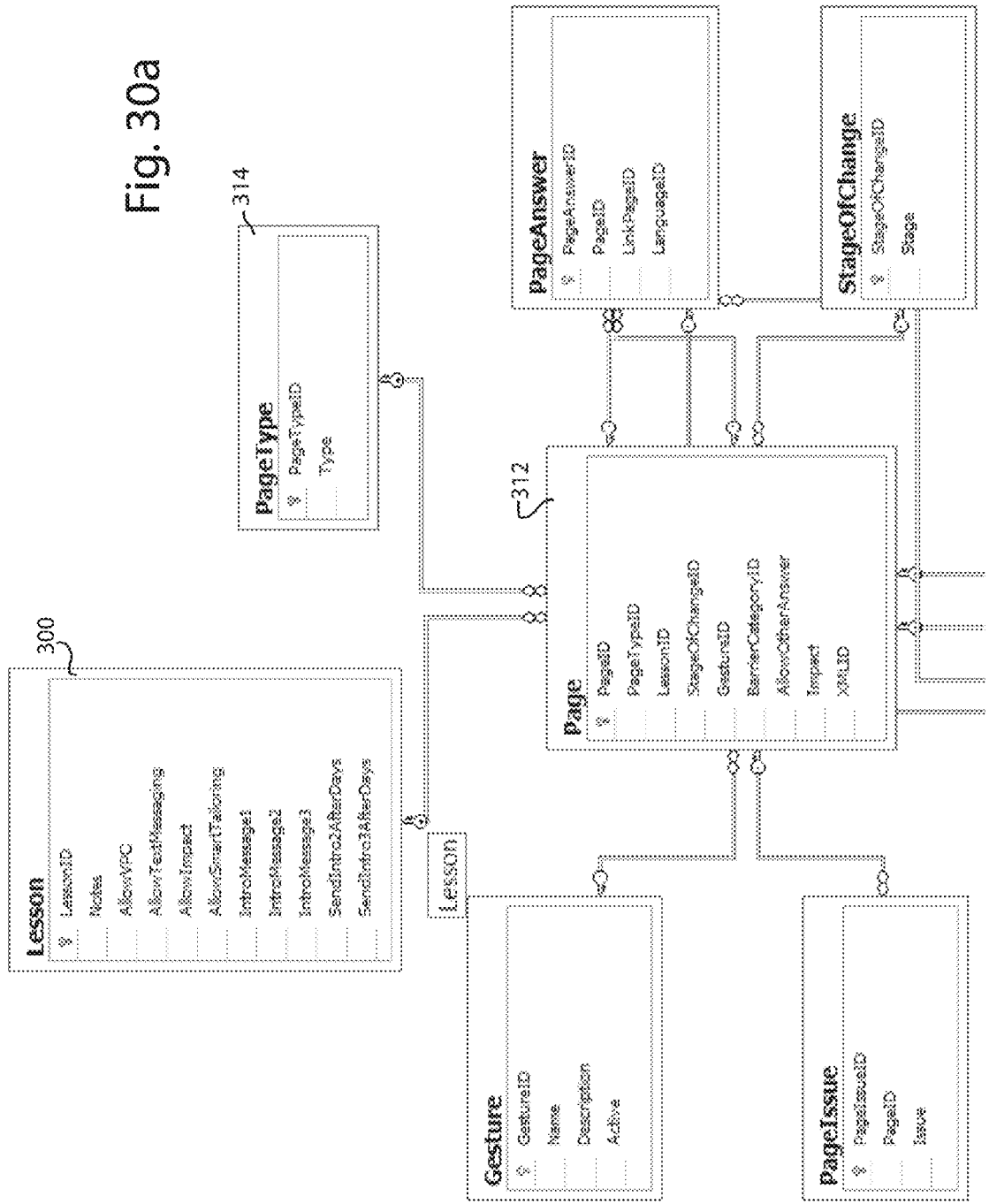
Figure 30B:
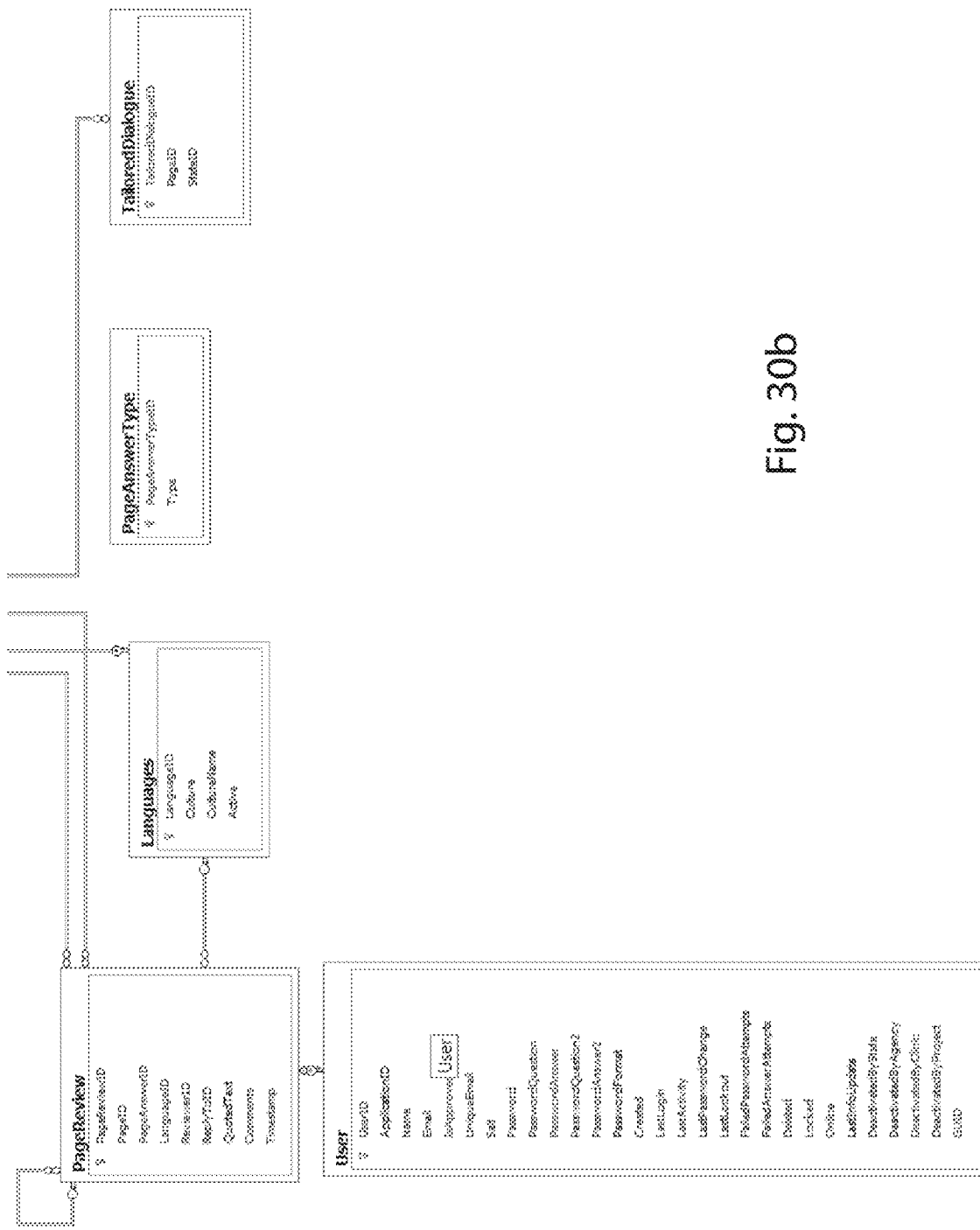
Figure 31:
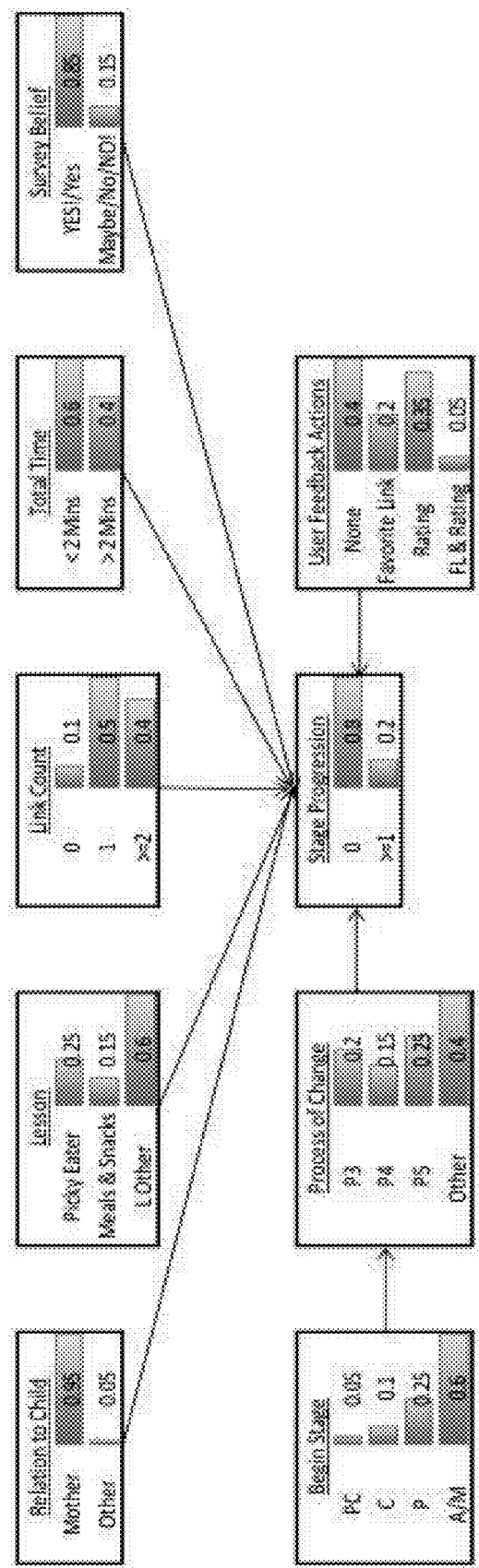

FIGS. 30a and 30b; a data structure diagram illustrating the page data structure used by the lesson manager and other managers within the computer-implemented system;

FIG. 31 illustrates an exemplary Bayesian network model useful in understanding how the link manager is constructed and used.

Corresponding reference numerals indicate corresponding parts throughout the several views of the drawings.

DETAILED DESCRIPTION

Example embodiments will now be described more fully with reference to the accompanying drawings.

The behavioral intelligence framework content management system is a fully functioning and self-contained Internet-based, backend content management system and front end framework that provides for the comprehensive development, management, and implementation of behavior change based lessons.

Figure 1:
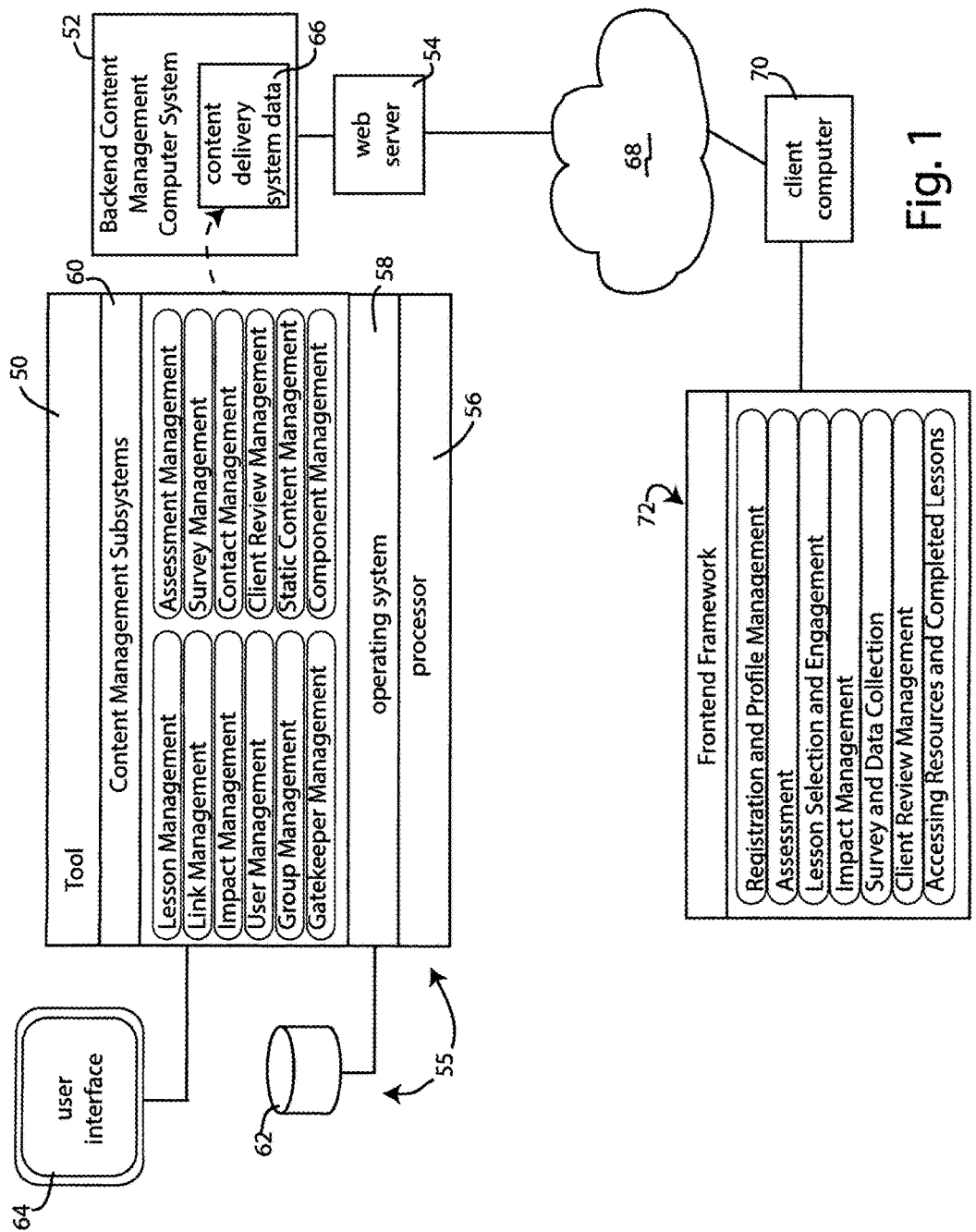
FIG. 1 is a block diagram of the content management system, including the computer-implemented tool for constructing the content management system and front end framework implemented by a user's browser when accessing the content management system.

An exemplary embodiment of the behavioral intelligence framework content management system is shown in FIG. 1. The system includes a computer-implemented tool 50 for building a backend content management system 52 that is coupled to a suitable server, such as web server 54. The computer-implemented tool 50 employs an electronic circuit 55 that includes a processor (or multiple processors) 56 running an operating system 58 that supports the computer-implemented tool. The tool 50 is implemented as an extensive set of content management subsystems 60 which will be more fully described below. The tool 50 further includes a data storage system 62 and a suitable graphical user interface 64 with display through which the administrator or content creator interacts to construct and customize the content management system 52 to suit a particular behavioral modification purpose or use case.

Using the tool 50, the administrator or content creator constructs specific content delivery system data 66, which is then loaded into the backend content management computer system 52 to program or adapt it to the particular behavioral modification purpose or use case. The web server 54 communicates with the backend content management system 52 and delivers content interactively based on the content delivery system data 66 loaded into the backend content management system. The content delivery system data 66 comprises textual content, audio-video content, and executable code that has been specifically customized for the particular behavior modification use case, as developed using the tool 50.

The web server 54 communicates over the Internet 68 with one or more client computers 70 running suitable web browser software. By accessing the web server 54 the client computer is supplied with instructions causing the client computer to implement a front end framework, shown diagrammatically at 72, that delivers change-based interactive lessons to the user.

The tool 50 manages the development of educational and behavioral lessons which are supplied as a fully operational content delivery system data 66 to the backend content management computer system 52. Based on the configuration provided by the administrator or content creator using tool 50, the backend content management computer system then delivers the development of educational and behavioral lessons and mediates interaction with the user in a manner that facilitates behavioral modification through personalized "virtual educator" interaction.

The system is unique in that it provides the ability to (1) build education and behavior change lessons and corresponding educational links, (2) manage lesson algorithms, dialogue, links, resources, content, surveys, and virtual educator files, and (3) manage the site groups, site content, user roles, user assessment, user input, and user supplied comments and questions. These functions exist within the following 12 content management subsystems 60:

Lesson Management
Link Management
Impact Management
User Management
Group Manager
Gatekeeper Management
Assessment Management
Survey Management
Contact Management
Client Review Management
Static Content Management
Component Management Each of these content management subsystems is implemented as self-contained software objects using the Microsoft .Net Framework components and associated programming tools to develop the subsystems 60 as independent software objects that interact with each other through shared data structures stored in computer memory. A discussion of each of these subsystems and how they are programmed to interact with each other is presented below.

The front end framework 72 is an Internet-based behavior change diagnostic and application system that moves, or "triages," users through a process to better direct selection of stage of readiness to change behavioral interventions and resources. Central to this system is a virtual educator who both personalizes the session and provides an interactive and dynamic interface between the user and the system. In essence, this educator is the human representation of the algorithms and coding that drives the front end system. The front end framework is steeped in theory and built on key elements from well-known behavior change models including the transtheoretical stages of change model, theory of planned behavior, and persuasive communication. It consists of the following seven user functions:

Registration and Profile Management
Assessment
Lesson Selection and Engagement
Impact Management
Survey and Data Collection
Accessing Resources and Viewing Completed Lessons
Client Review Management Each of the above system managers and functions is described in more detailed below.

Backend Content Management System

The backend content management computer system 52 consists of thirty-three system managers across twelve content management subsystems. These are loaded into the backend content management computer system 52 as executable program instructions, configuration data and educational content as part of the content delivery system data 66.

These twelve content management systems are also represented in the computer-implemented tool 50 which is used to create and customize them for the particular behavioral change purpose or use case. For illustration purposes, these twelve content management systems associated with tool 50 have been shown in FIG. 1 as at 60. It will be understood that the content delivery system data 66 would also have executable code and data components representing these twelve content management subsystems.

The essential difference between the content management system associated with tool 50 and the content management system associated with content delivery system data 66 is that the systems associated with the tool 50 are for development; whereas the systems associated with the content delivery system data 66 have been customized for a particular behavioral change use case. Thus the content management subsystem structures within tool 50 are used to create the use case-specific content management subsystem structures that are deployed via the content delivery system data.

Each of the twelve content management subsystems will now be described. Most subsystems comprise a collection of object-oriented manager objects that perform specific tasks and communicate with other manager objects by passing data through shared data structures. Each content management subsystem description below contains a list of its individual manager objects. Interaction among these managers is shown in the accompanying figures.

System 1: Lesson Management

Figure 2:
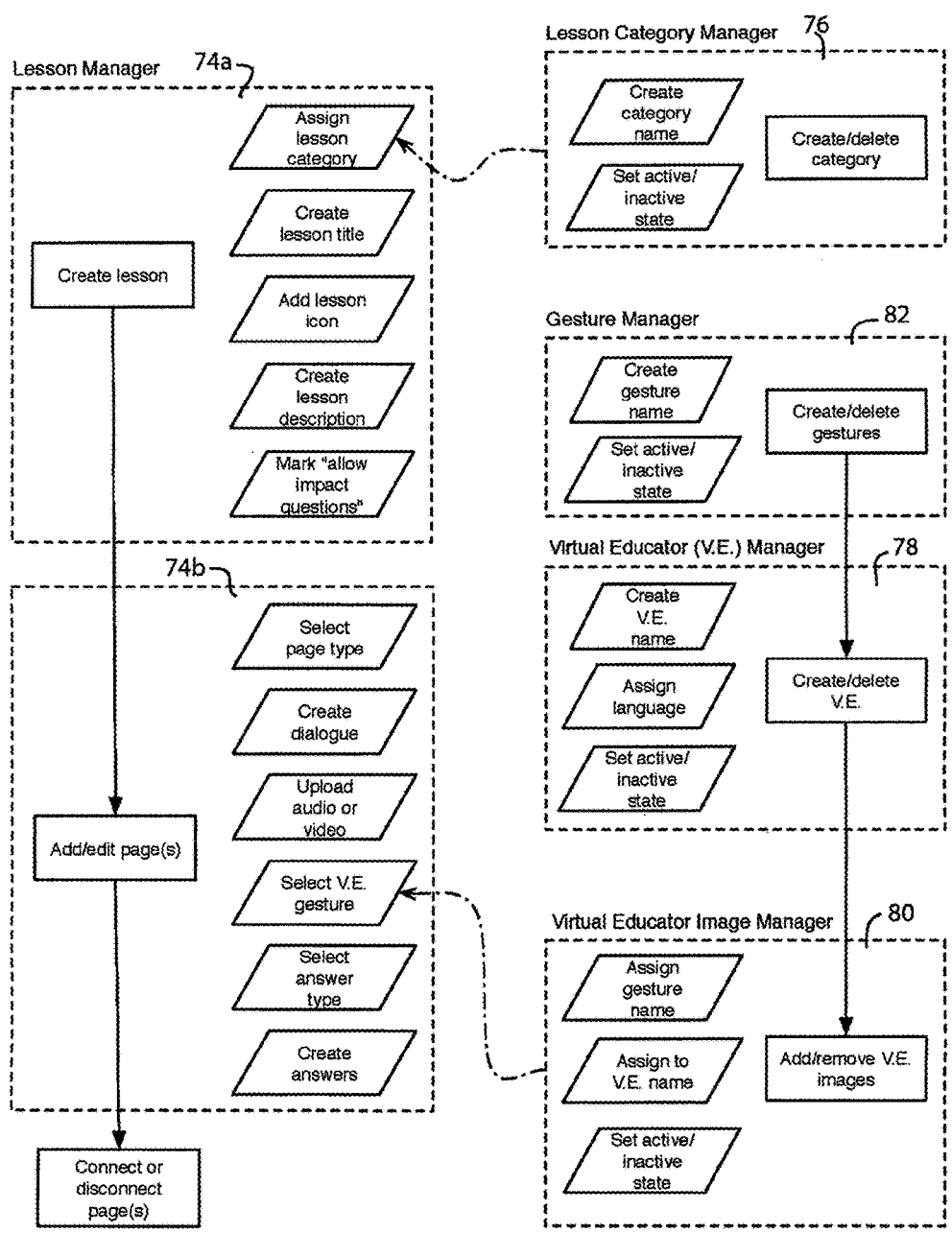
FIG. 2 is a software object diagram depicting how the components of the lesson management subsystem is constructed.

Shown in FIG. 2 the lesson management subsystem employs the following manager objects:

Lesson Manager
Lesson Category Manager
Virtual Educator Manager
Virtual Educator Image Manager
Gesture Manager
Completed Lesson Auto Message Manager The Lesson Manager 74a and 74b provides the ability for an administrator to create and manage behavior change focused lessons, including all algorithms, virtual educator gestures (if using randomly assigned static virtual educator images), virtual educator audio and video (if using audio-video virtual educator), dialogue, personalized dialogue based on user profile characteristics, opt-in option for adding on additional special feature systems, stage of change progression based on user interaction with the system, tailoring based on groups defined in the Group Manager (a component of the Group Management subsystem discussed below), follow up impact dialogue and resources as defined in the Impact Manager (a component of the Impact Management subsystem discussed below), Smart System Tailoring functionality (discussed in connection with the Link Management subsystem below), and lesson specific information (title, icon, description, lesson category, user testimonial or comment).

The lesson manager is implemented by the processor of the tool 50 whereby the processor is programmed to generate a decision tree structure and to populate that tree structure with first content in accordance with input received from the user via the user interface to define a lesson comprising a plurality of lesson pages stored in memory.

The lesson manager 74a-74b component or object also allows for administrator routing of the lesson to other system users for review and approval. The lesson building aspect of this system component provides for easy-to-use creation or editing of content, dialogue, and pathways. Lessons are then easily created and managed by the administrator without the need for additional programming. Lesson creation is based on a stage of change based algorithm built using tools in the Lesson Manager 74a-74b. The administrator creates "pages" that represent individual web pages in the lesson. Each page created contains the ability to contain dialogue, tailored dialogue based on defined group created using the Group Manager, page type, virtual educator gesture (for static image virtual educators), audiovisual virtual educator, and questions and answer type (i.e., multiple choice, yes/no, open text field).

Within the dialogue field, the administrator can insert tooltips associated with a particular word or phrase or placeholders that pull in information from the particular user's profile. Once pages are built, they are added to the algorithm structure by clicking and dragging the page into the algorithm. Page links are created by the administrator within the algorithm through click and drag. The Lesson Category Manager 76 provides the ability to create and organize lessons into common categories, which are then displayed on the front end of the system. A Completed Lesson Auto Message Manager (not shown) provides capability to add email response to be sent to users upon completion of a lesson.

Figure 20:
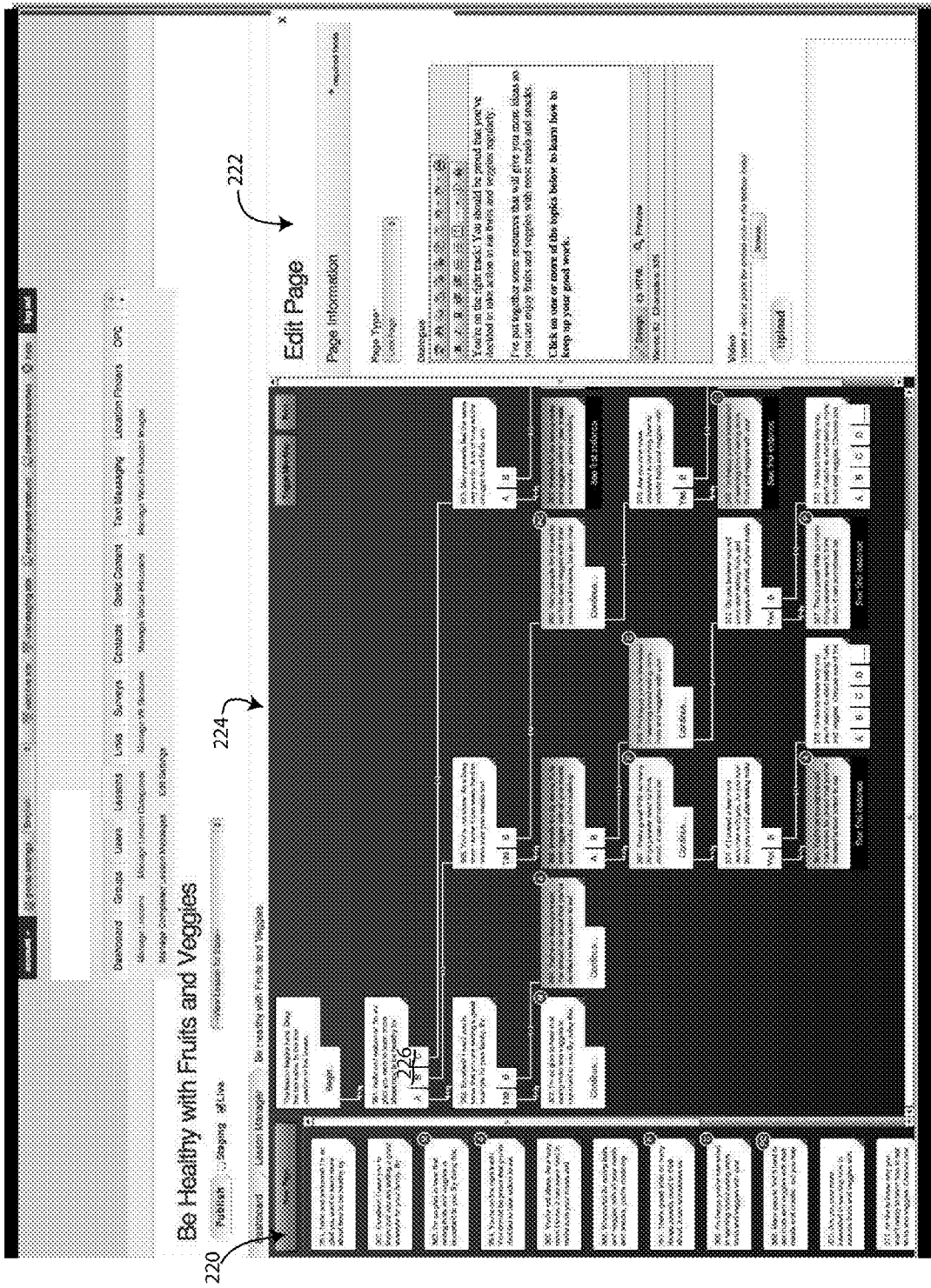
FIG. 20 is an exemplary screen from the lesson manager as generated by the tool.

An exemplary screen from the lesson manager is shown in FIG. 20. This screen is generated by tool 50. In the left column 220 each individual page of text is displayed. Each page is assigned a unique page number. Selecting any of these individual pages opens an editing window at 222. The administrator or content creator creates all pages required for the lesson and then assembles them in a hierarchical arrangement by dragging and selecting pages into the linking region 224. The administrator or content creator then assigns links between individual lesson pages. Note that the links are specifically attached to labeled nodes corresponding to choices the user will be offered when the lesson is published. For example, the page at 226 is a multiple choice page offering three follow on pages as depicted by the links. The screen may also be used by the administrator or content creator to associate to a given content page a specific educator character image and a specific facial expression or gesture.

Figure 21:
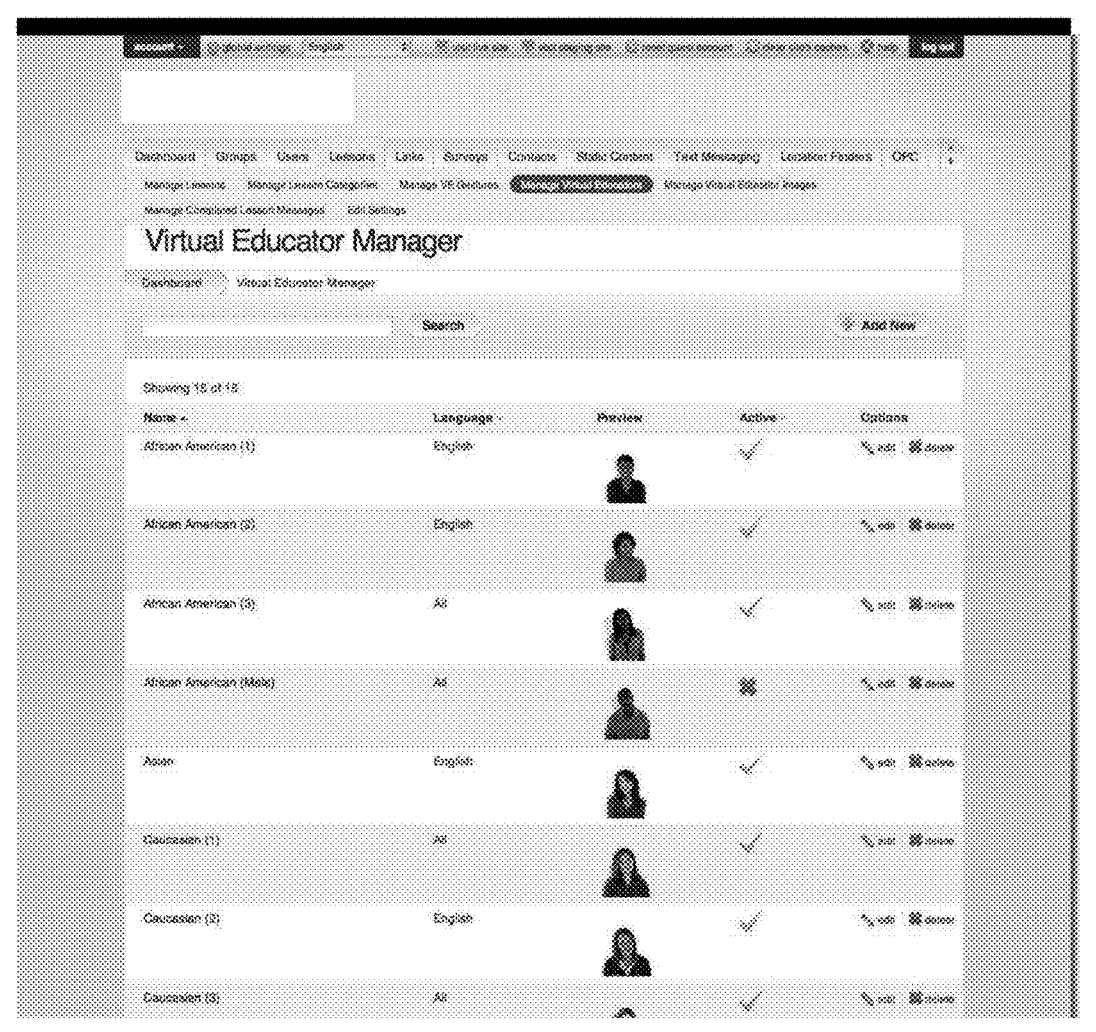

The virtual educator guides the user through the lesson and provides the dialogue. The Virtual Educator Manager 78 provides the capability to manage the static virtual educators. Virtual educators can either be randomly or specifically assigned to a lesson. The Virtual Educator Image Manager 80 allows the ability to add and edit a group of images associated with the different virtual educators. FIG. 21 shows the screen generated by tool 50 with which the administrator or content creator selects a virtual educator image. This screen shows a visual image of each virtual educator image choice, including several different gesture or body position options.

The virtual educator manager is implemented by the processor of the tool 50 which is programmed to store in memory a plurality of different graphical images of an educator character, each image corresponding to a different facial expression or gesture, the virtual educator manager implemented by the processor being further programmed to respond based on input received from the user via the user interface by associating and storing in memory a selected one of the plurality of different graphical images with selected ones of said lesson pages.

Figure 22:
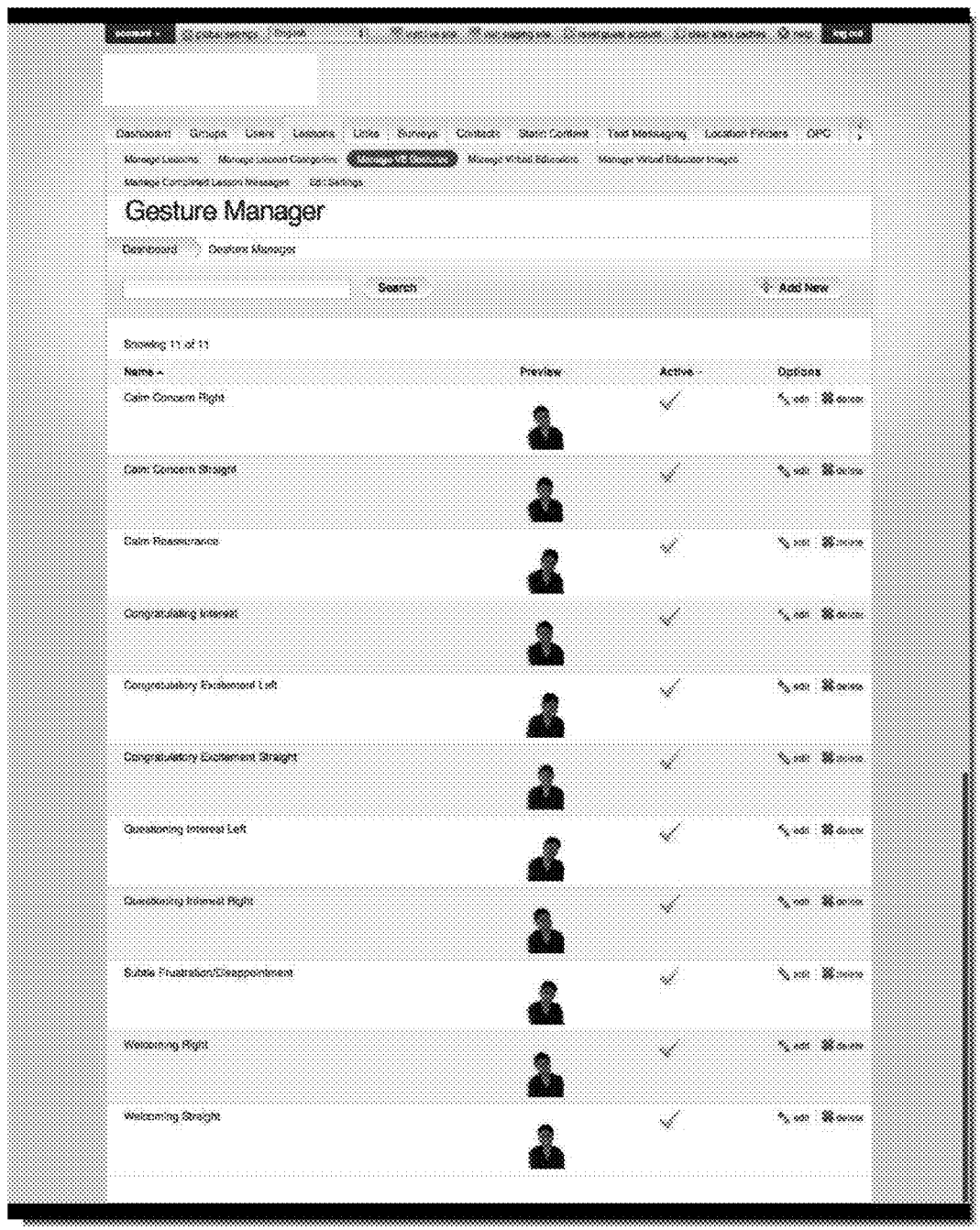
FIG. 22 is an exemplary screen from the gesture manager as generated by the tool.

The Gesture Manager 82 provides the ability to create different virtual educator static image gesture categories, for which specific virtual educator images can be assigned. These categories allow for different facial and posture gestures to be added to the system that relate to a specific dialogue response intended for the user. The gestures mimic empathetic listening and can include a variety of gesture poses. Audiovisual virtual educators are video clips of lesson dialogue and can be used in place of the static virtual educator images. FIG. 22 shows the screen generated by tool 50 by which the administrator or content creator can select a specific gesture of the chosen virtual educator. These are chosen to match the context of the message being delivered on the particular page.

System 2: Link Management

Figure 3:
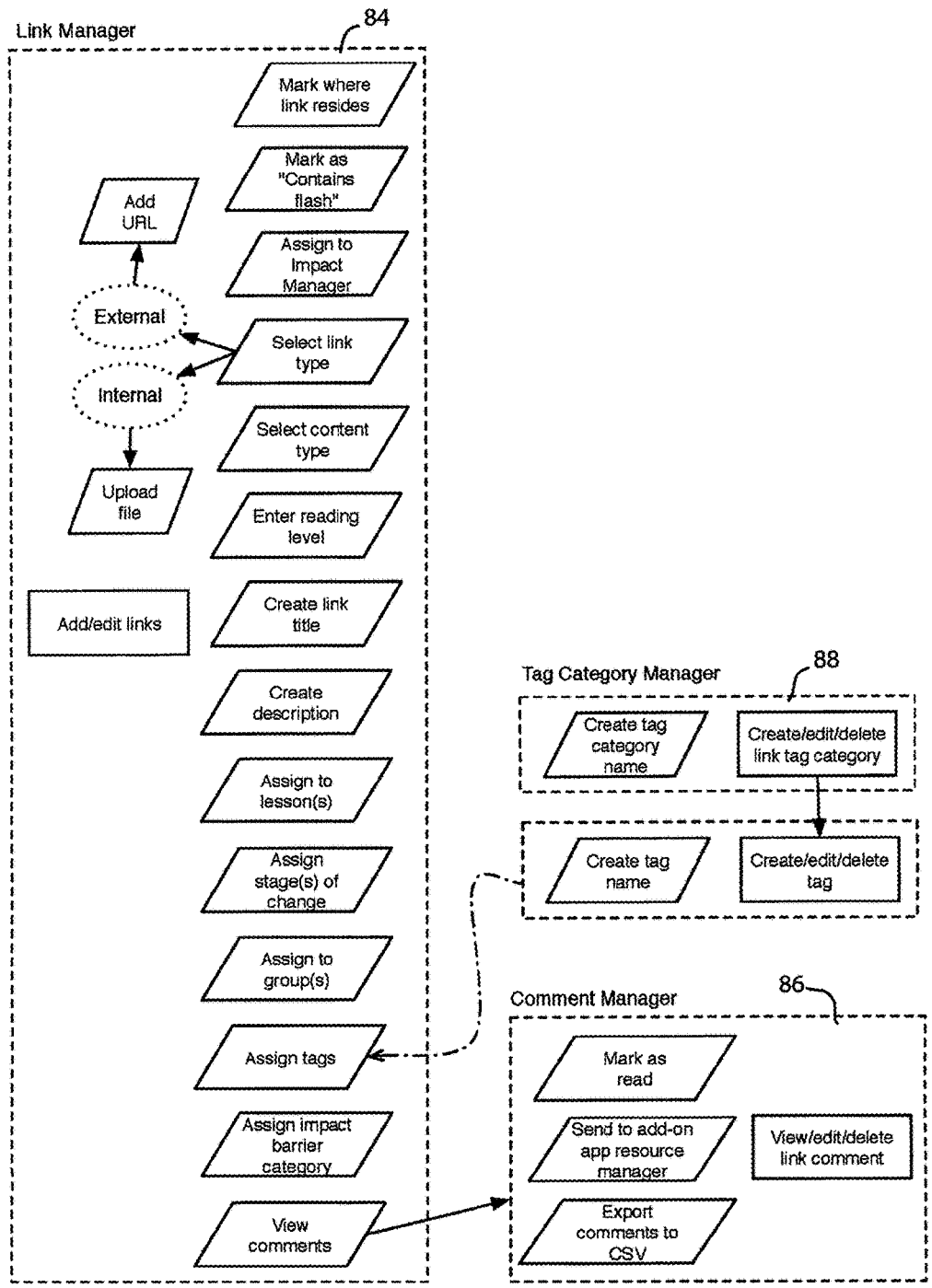
FIG. 3 is software object diagram depicting how the components of the link management subsystem is constructed.

Shown in FIG. 3, the link management subsystem employs the following manager objects:

Link Manager

Comment Manager

Tag Category Manager

Link Reporting Manager

Links stored in the backend content management computer system exist autonomously from the lessons that use them. The Link Manager 84 provides the ability to upload both internal and external links to the system. These links are categorized based on common tags, such as type of link, measures of usability (e.g., reading level), stage of readiness to change, processes user engage in to elicit change, status (active vs. inactive), approval status, and related lesson(s) and group(s) to which it applies. Links are also tagged by the front end user action (i.e., main lesson link, dashboard resource library, or impact barrier link) to which they will connect. A stage of change wizard containing a series of stage-based questions is available to assist in automating link tagging for stage of readiness to change.

The link manager is implemented by the processor of the tool which is programmed to cause the backend content management computer system 52 to store a plurality of links autonomously from the lesson, the links corresponding to second content to supplement the first content, the link manager implemented by the processor being further programmed to respond based on input received from the user via the user interface to define a conditional reference between a lesson page and the second content that tests at runtime of the change-based lesson delivery system whether the referenced second content is available and suppresses the link if it is not available Once uploaded to the system, links are pulled into a lesson when accessed by a user. The system identifies a preset number of links to pull into each "link list page" of the lesson each time it is accessed by a user. Links are not hard coded within a particular lesson so if the link is dead it is automatically made inactive by the system. The Smart System Tailoring aspect of the backend content management computer is an algorithmic-driven approach for identifying which links to be displayed to the user based on a set of user characteristics, site behaviors, and survey item responses. This smart system aspect of the site ensures links are selected and delivered to the user based on the likelihood of greatest success in improving educational or behavioral impact. The Smart System Tailoring feature has the capability to be based on any set of characteristics designated by the system administrator. The administrator may activate this system on a lesson-by-lesson basis. An exemplary Smart System Tailoring implementation is discussed below.

The backend content management computer allows users to leave comments about and rate links they have viewed, which can then be accessed by other users during their individual interaction with the front end application executing in accordance with the content delivery system data 66. The Comment Manager 86 provides the ability for administrator to view, delete, and export any comments users submit. Comments can be searched by lesson, group, and date.

The Tag Category Manager 88 provides administrator with the ability to create categories under which a series of keyword tags can be included. For example, if "child age" was the category then the corresponding keyword tags might be "toddler" and "infant." These tags can then be assigned to specific links and resources. One place these tags are used is on the resource list page. The system searches for resources and links that match a user's profile tags and displays those resources to the user; allowing links and resources to be tailored by the system. Tags can also be used when the user is attempting to filter resources while conducting a search.

Link behavior can be accessed by the administrator through the Link Report Manager. Specifically, link status, inactivated links, link usage, and lessons that have less than the administrator defined number of links attached to them.

Smart System Tailoring

The Smart System Tailoring aspect is preferably a component of the link manager which is implemented by the processor of the tool 50 having been further programmed to implement an algorithm-driven smart system tailoring process whereby links are selectively displayed at runtime of the lesson delivery system based on information extracted from persons using the lesson delivery system.

Figure 28:
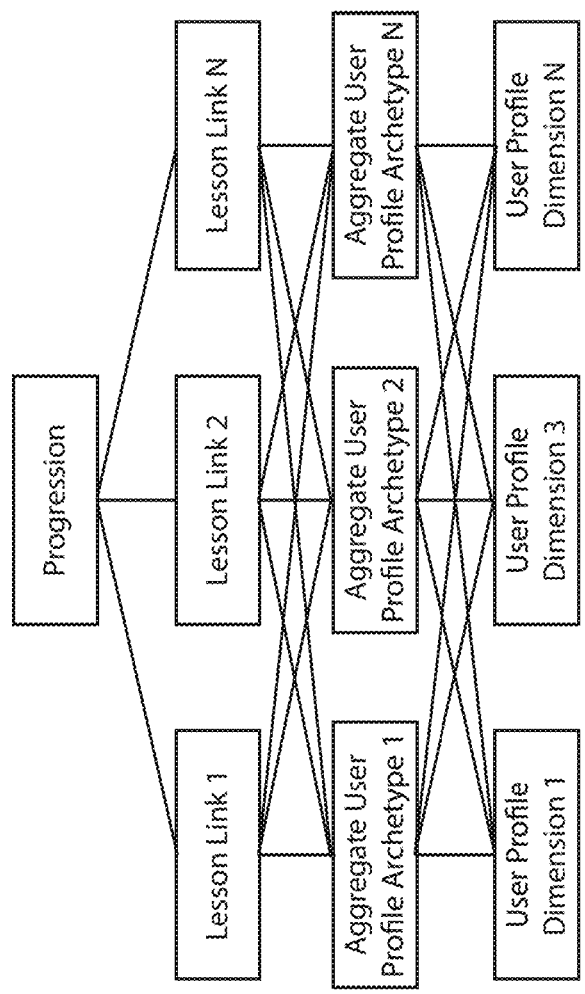
FIG. 28 is a block diagram illustrating an exemplary model-based detector used to implement the smart system tailoring functionality.

FIG. 28 shows the details of a model-based embodiment of the Smart System Tailoring component. The Smart System Tailoring component of the Behavioral Intelligence Framework is a departure from the paradigm of collaborative filtering where user preference and feedback for items is used to recommend items to other users based on the prediction of their preference and feedback for those items. This is demonstrated by two key characteristics. First, rather than collecting user and community preferences, Smart System Tailoring employs an evaluative filtering methodology that assesses the user interaction with the lesson based on their progression through the Transtheoretical Model of stages of change. Thus recommendations are generated, not based on user feedback or preferences, but based on user progression toward behavior change as evaluated using the Transtheoretical Model. Second, unlike other recommendation systems, Smart System Tailoring does not generate recommendations based on conversion end points such as the selection or purchase of an item, but rather on progression toward a change in behavior that is not directly measureable.

Smart System Tailoring utilizes a naïve Bayesian model (NBM) model to detect a likelihood of progression toward behavior change when interacting with a given lesson. FIG. 28 displays the Smart System Tailoring NBM illustrating the key contributors to the posterior probability of behavior change progression. The posterior probability of a random event or an uncertain proposition (e.g. whether or not user will progress in stage) is the conditional probability that is assigned after the relevant evidence (distribution of key variables) is taken into account.

An issue that many collaborative filtering methodologies are sensitive to is having too sparse feedback from a particular user to provide recommendations tailored to that user. Smart System Tailoring alleviates this issue by using user profile aggregates or archetypes to represent all prior users similar to the current user. This is especially important for the Behavioral Intelligence Framework as many users only complete one or two lessons, as compared to web sites like Amazon or Netflix where each user may make many purchases or rate many items.

The predicted progression for any given link for the given user archetype serves as the score or rating that prioritizes the display and order of many possible lesson link options that could be selected by a user throughout their lesson. This prediction is calculated by:

$$p(\text{LessonLink}_{(n)}) = \alpha p(\text{Progression}|\text{LessonLink}_{(n)}, \text{Archetype}_{(n)}) \times p(\text{Archetype}_{(n)}) \times p(\text{Progression})$$

Smart System Tailoring implements this using structured query language (SQL) on a database comprising all of the partial probabilities of progression for all permutations of every user profile characteristic (valid and null) for all lesson links. These data are updated with each user interaction and propagates the lesson link scores, or in other words their likelihood of progressing the user toward behavior change. An example SQL expression to accomplish this simultaneous, real-time retrieval of lesson link scores from the database can be described by:

SELECT LessonLink, SUM(p*) FROM DBO. TABLE WHERE LessonLink=n AND Archetype=n and Lesson=n GROUP BY LessonLink ORDER BY SUM (p*) DESC In an exemplary embodiment of the behavioral intelligence framework designed for behavior modification of child rearing skills, the user profile archetype might consist of the following key dimensions:

Age

Child Age

Relation to Child

Pregnancy Status

State of Residence

Race

Lesson

Beginning Stage of Change

Thus, Smart System Tailoring utilizes an evaluative filtering model for generating recommendations to users about which lesson links they should interact with in order to maximize the probability that they progress toward healthy behavior change. User and community preference and feedback are not considered, rather the extent of progression of the user toward behavior change as assessed by the Transtheoretical Model serves as a system preference that is assigned to the lesson link for a given user profile archetype.

System 3: Impact Management

Figure 4:
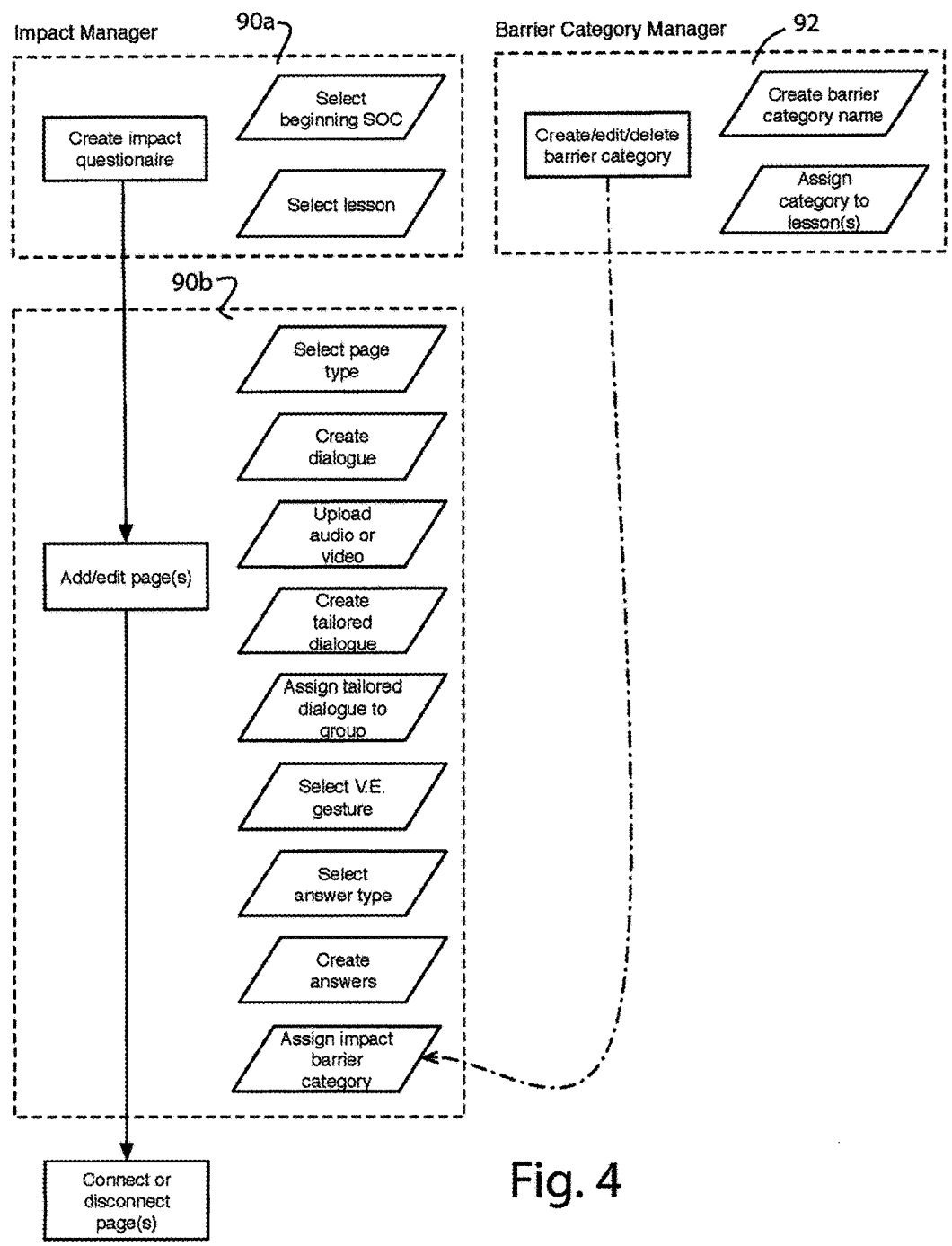
FIG. 4 is software object diagram depicting how the components of the impact management subsystem is constructed.

Shown in FIG. 4, the impact management subsystem employs the following manager objects:
  Impact Manager
  Impact Report Manager
  Barrier Category Manager The Impact Manager 90a and 90b uses the algorithmic lesson build structure inherent with the Lesson Manager to build a stage of change impact questionnaire using web pages that are delivered to users following a defined period of time since their last lesson completion. Text associated with the impact questionnaire will also be entered in appropriate sections of the lesson edited through the Lesson Manager. The impact questionnaire for a particular lesson will be made available to users for a set period of time if "Allow Impact Questionnaire" is checked off in the Lesson Manager.

Figure 23:
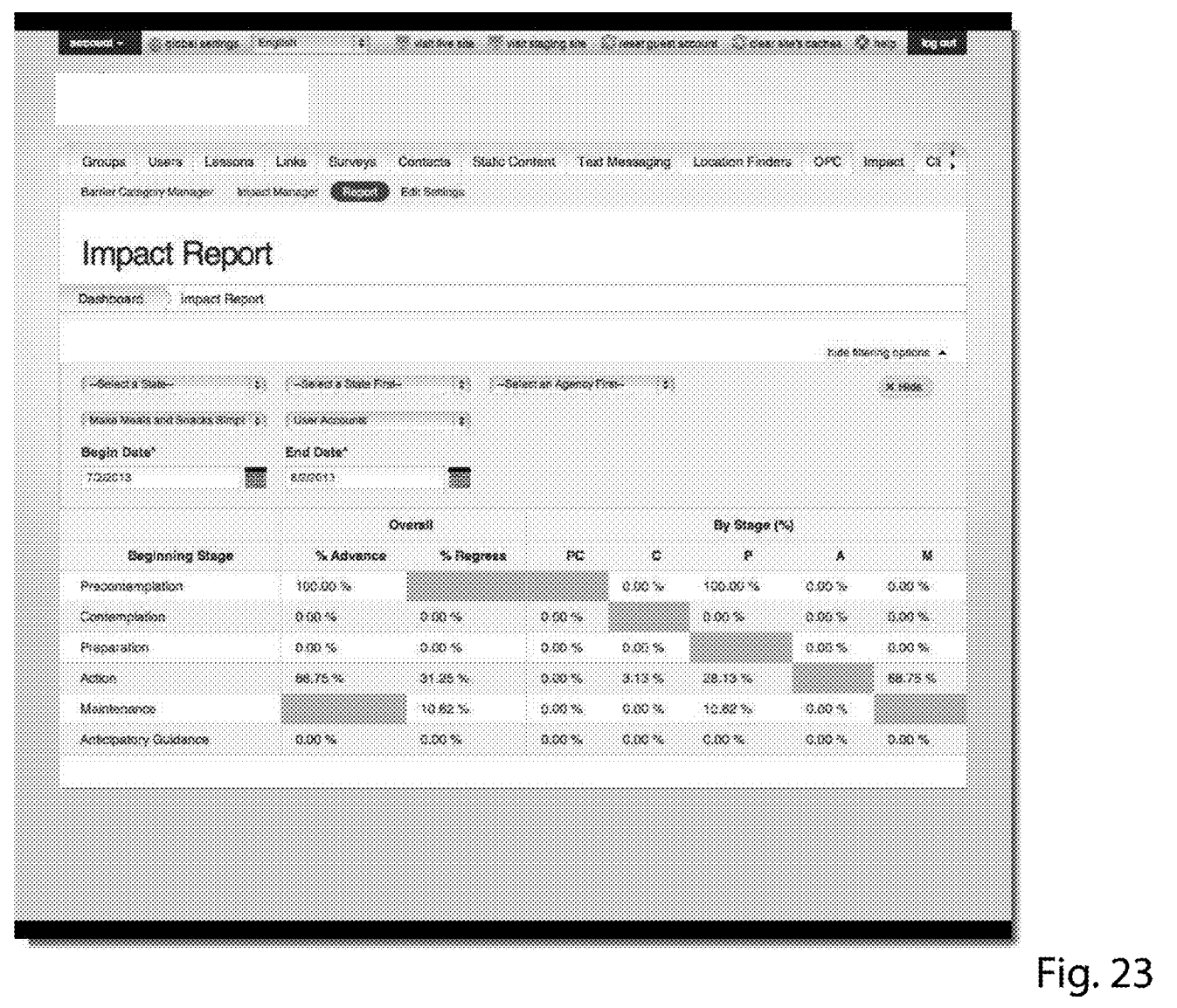

The impact manager is implemented by the processor of tool 50 which is programmed to define in memory a data structure in which to store a date when the lesson was completed by a person using the lesson delivery system and programmed to compute a predefined interval after the stored date representing a later date on which to issue a stage-of-change impact questionnaire The administrator creates and manages barrier link categories available for administrator to use within the Impact Manager using the Barrier Category Manager 92. A barrier category is created and assigned to barrier-related links within the Link Manager 84 (FIG. 3), and a barrier category is chosen within the Impact Manger link page to determine what links to display on the front end for that page within the impact questionnaire. The system looks for instances where there is a barrier category match between a link and page and displays those links on the page. An Impact Report Manager (not shown) allows stage of readiness to change impact data results for behavioral lessons to be displayed based on group, lesson, and date range. FIG. 23 shows an exemplary report generated by the impact report manager.

System 4: User Management

Figure 5:
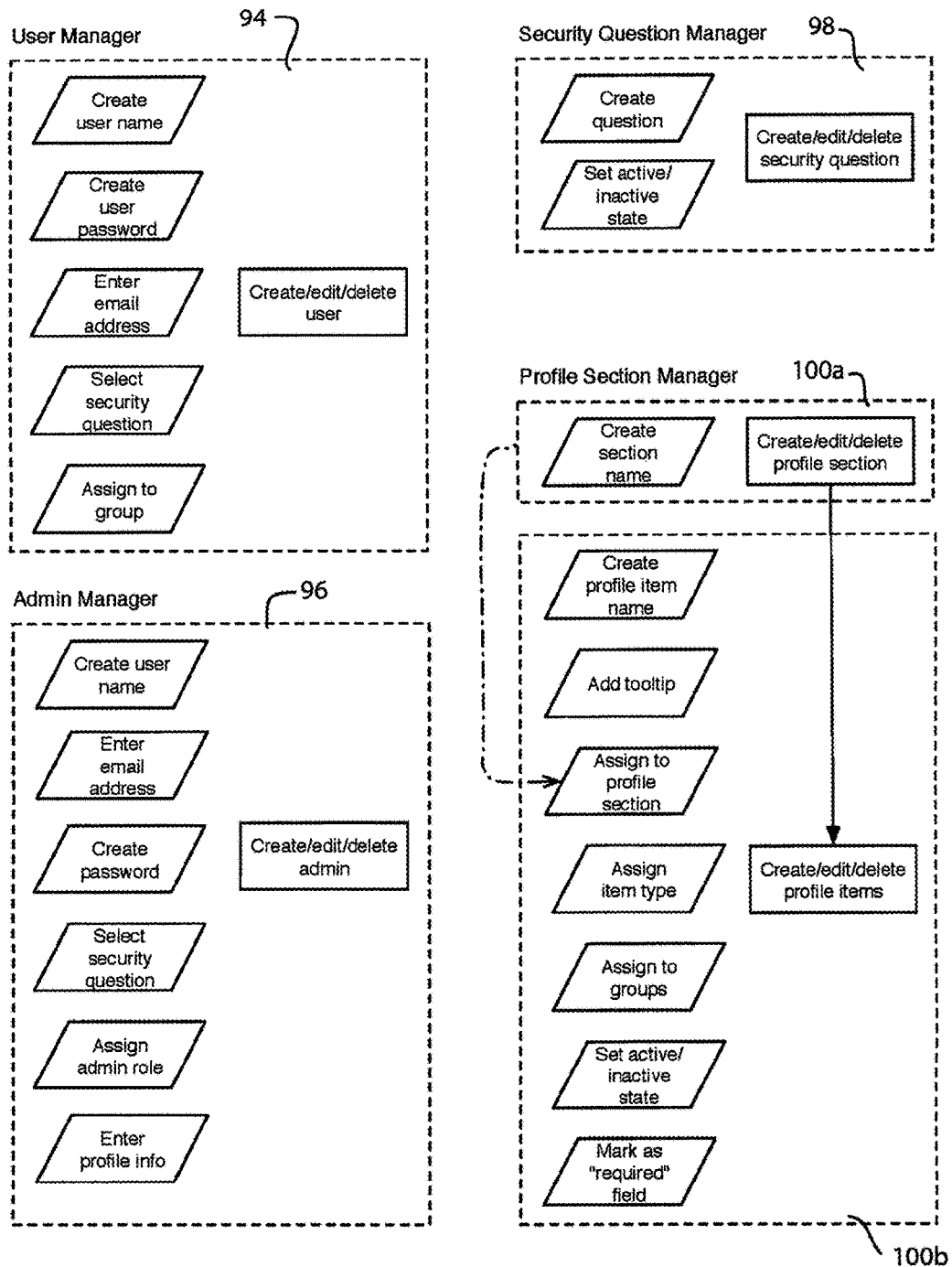
FIG. 5 is software object diagram depicting how the components of the user management subsystem is constructed.

Shown in FIG. 5, the user management subsystem employs the following manager objects:
  User Manager
  AdministratorManager
  Profile Section Manager
  Security Question Manager The administrator can create user and administrator accounts and assign security roles through the User Manager 94 and Administrator Manager 96. Security questions for lost account retrieval are managed through the Security Question Manager 98 and appear in the user profile. User profile information can be created using the Profile Manager 100a and 100b. Administrator can create and manage the profile sections and items within the section that appear in the profile for each user. This feature allows new profile sections to be added for different groups in the system.

System 5: Group Management

Figure 6:
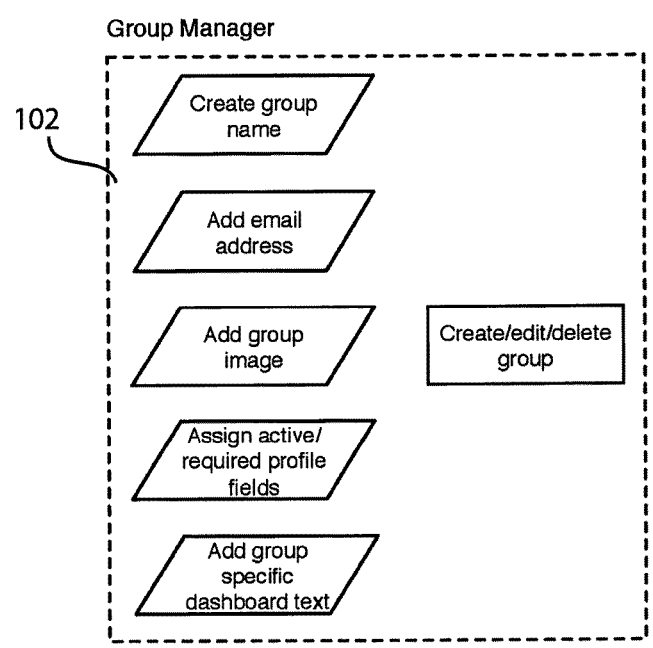
FIG. 6 is software object diagram depicting how the components of the group management subsystem is constructed.

Shown in FIG. 6, the group management subsystem employs the following manager objects:
  Group Manager The Group Manager 102 allows administrator to create groups that users can assign themselves to during the account registration process. administrator can select which user profile fields are active and required for each individual group, thus allowing the user profile to be group specific. Groups are created by filtering on specific fields either equal or not equal to values associated with each field. For example, the field "state" would have fifty possible values (each state name). All users who have the desired state value in their profile would become members of this new group.

System 6: Gatekeeper Management

Figure 7:
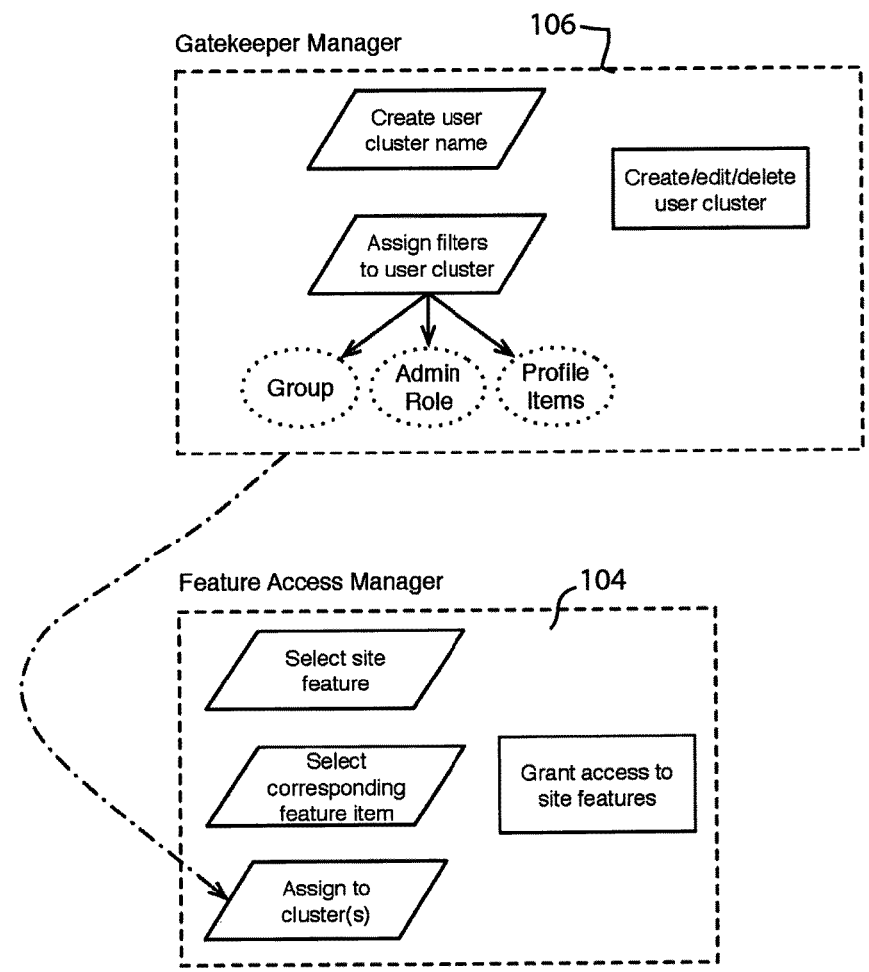
FIG. 7 is software object diagram depicting how the components of the gatekeeper management subsystem is constructed.

Shown in FIG. 7, the gatekeeper management subsystem employs the following manager objects:
  Gatekeeper Manager
  Feature Access Manager The Feature Access Manager 104 provides administrator with the ability to manage access to certain features, lesson categories, lessons, and survey questions built through other manager objects within the system. Administrators are able to restrict certain features to specific user cluster groups as defined within the Gatekeeper Manager 106. Previously created user clusters can then be granted or restricted access to specific features (e.g., lesson, lesson category, survey item, virtual educator). This management system provides the capability to provide different applications and features of the front end system to user clusters based on administrator defined characteristics.

System 7: Assessment Management

Figure 8:
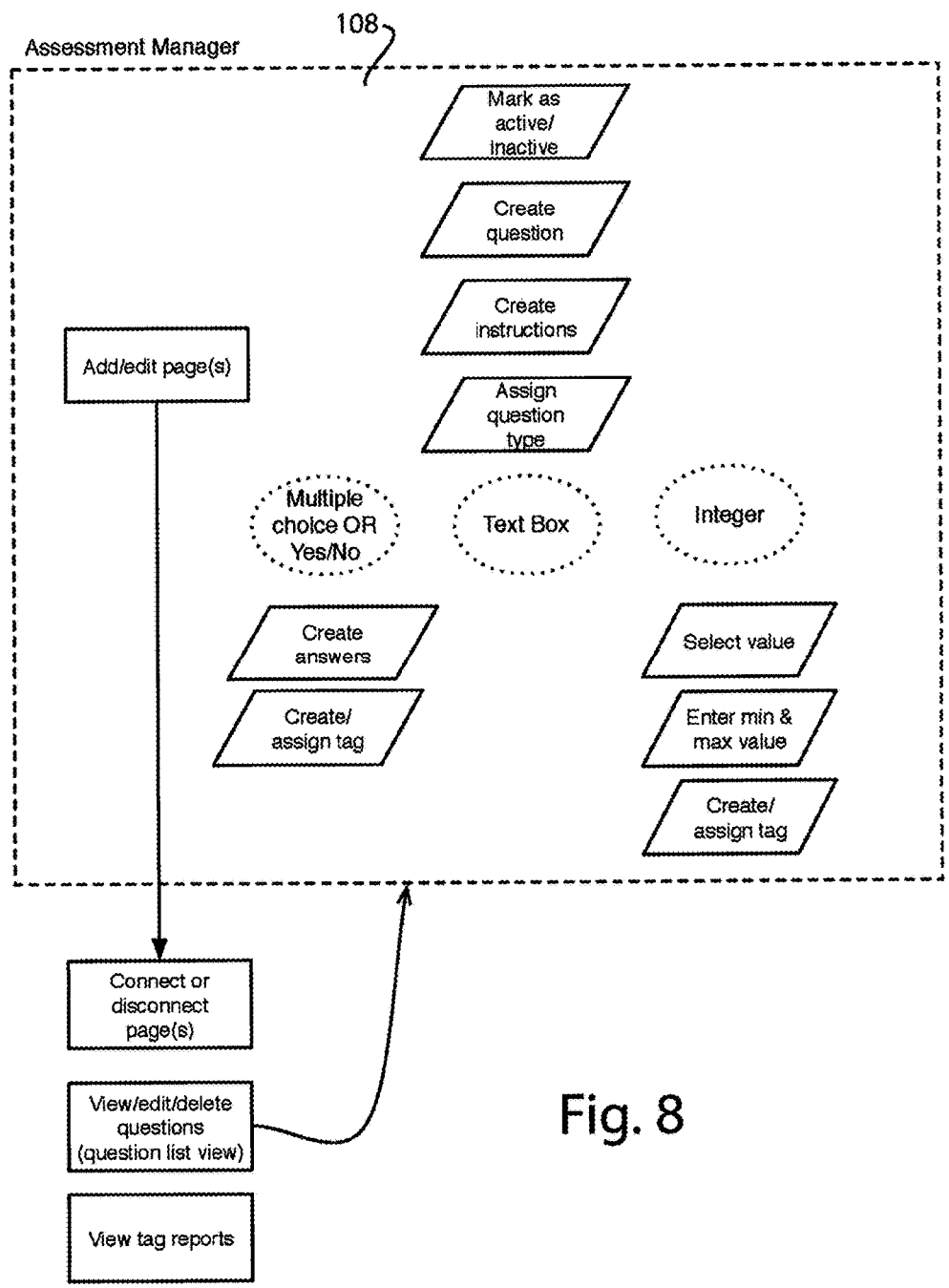
FIG. 8 is software object diagram depicting how the components of the assessment management subsystem is constructed.

Shown in FIG. 8, the assessment management subsystem employs the following manager objects:
  Assessment Manager
  Assessment Question Manager The Assessment Management system provides the ability to create various types of data collection items and create a lesson-based assessment using features inherent within the lesson building functionality of the Lesson Manager 74a-74b (FIG. 2). Assessment items, instructions, and answers can be created for inclusion in the lesson and edited or deleted using the Assessment Manager 108. The list of questions can be accessed in a user friendly list format within an Assessment Question Manager (not shown). Tags can be created for which answers are assigned. User selection of a tagged answer is stored in the user database record. This allows the ability to deliver specific links that are tagged the same way to users.

System 8: Survey Management

Figure 9:
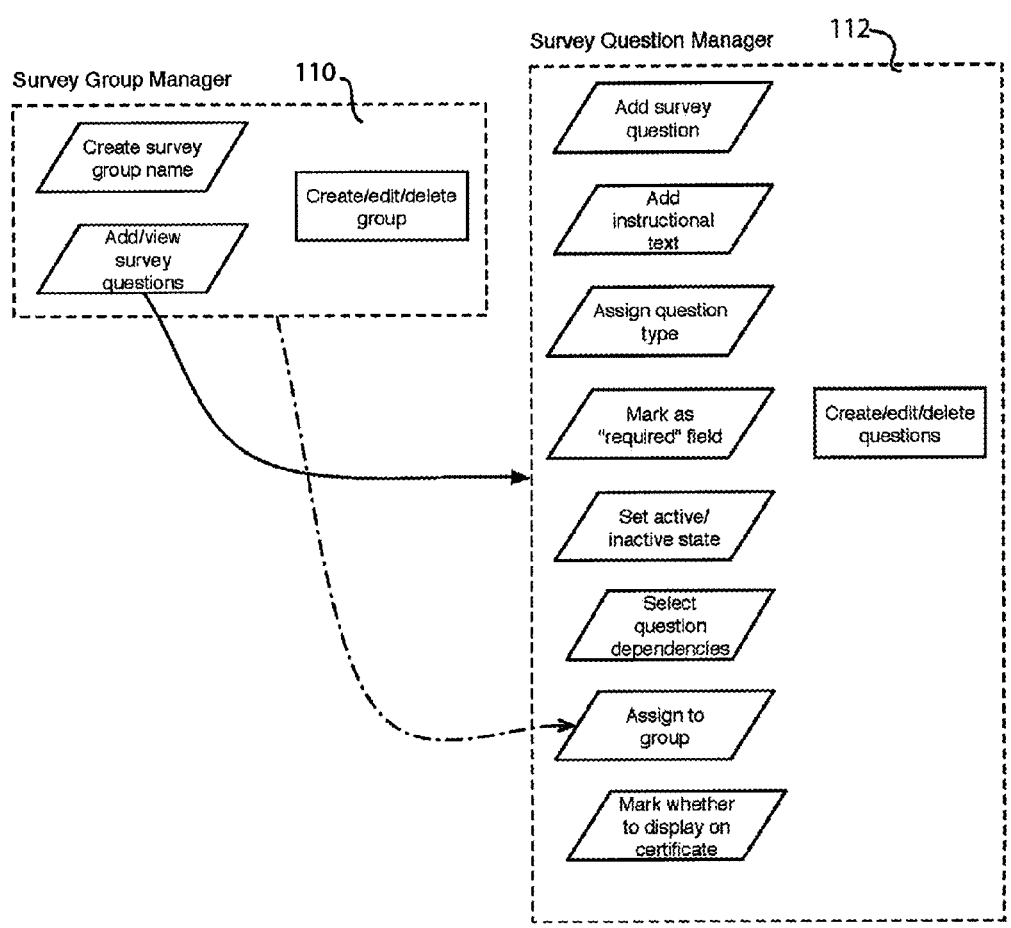
FIG. 9 is software object diagram depicting how the components of the survey management subsystem is constructed.

Shown in FIG. 9, the survey management subsystem employs the following manager objects:
  Survey Group Manager
  Survey Question Manager As each survey question in the system must be associated with a question group, administrator can use the Survey Group Manager 110 to create and manage survey question groups. The Survey Question Manager 112 is used to create and manage questions available in different surveys throughout the site and assign them to survey question groups defined in the Survey Group Manager. Administrator can manage access to the question in the Feature Access Manager of the Gatekeeper Management System, restricting it to specific user groups as needed.

System 9: Contact Management

Figure 10:
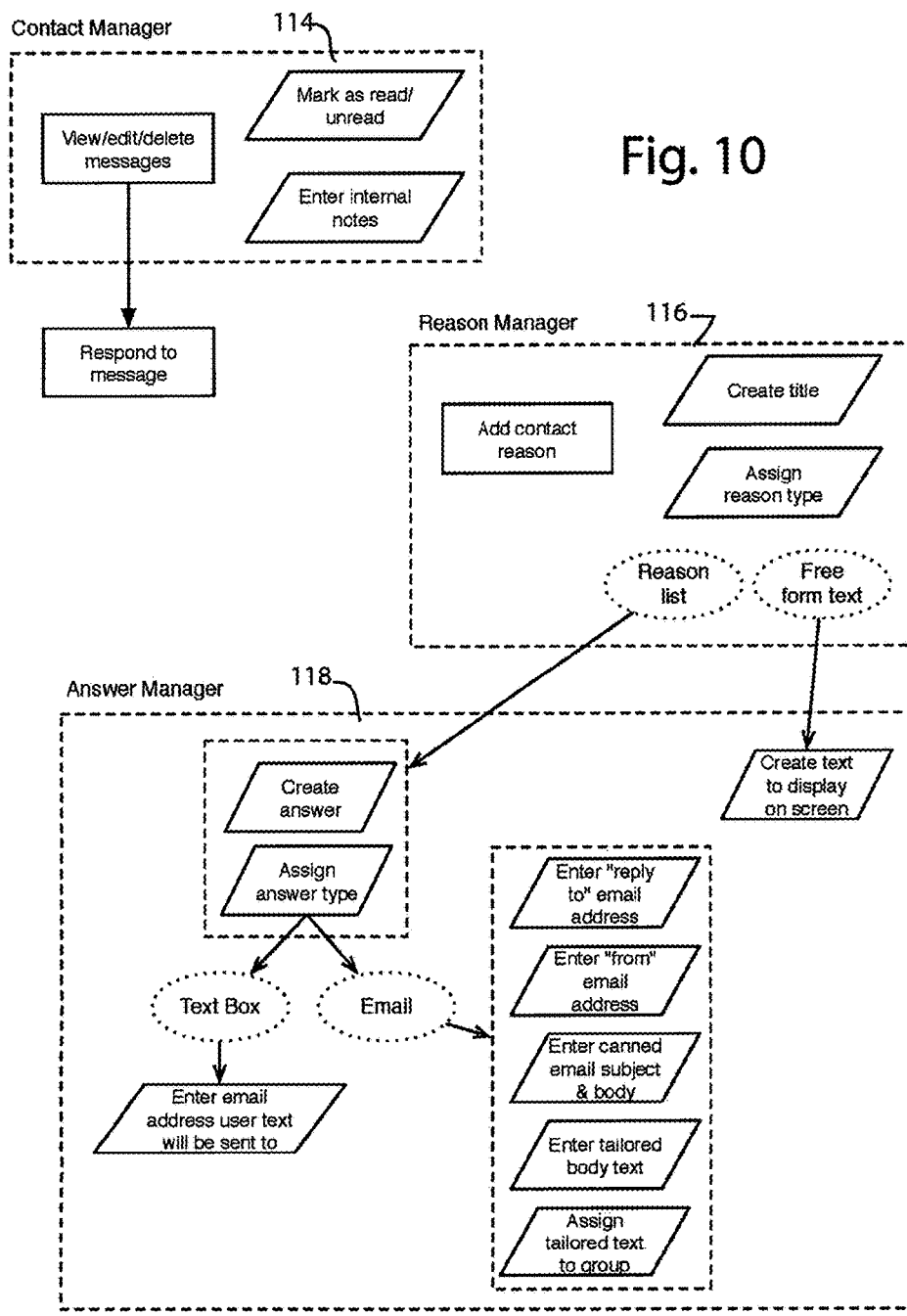
FIG. 10 is software object diagram depicting how the components of the contact management subsystem is constructed.

Shown in FIG. 10, the contact management subsystem employs the following manager objects:
  Contact Manager
  Reason Manager
  Answer Manager The Contact Manager 114 shows users who have submitted queries via a "contact us" page. administrator can view and manage these contacts through this manager. The Reason Manager 116 and Answer Manager 118 provide the ability to create and manage a reason for user contact with a list of answers from which the user can choose. Reasons can be in the form of text displayed on the screen or a list of administrator defined statements. Answers can either be emailed directly to the user as a predefined message or tailored by group, or in the form of a text box answer composed by the user to an administrator defined email address.

System 10: Client Review Management

Figure 11:
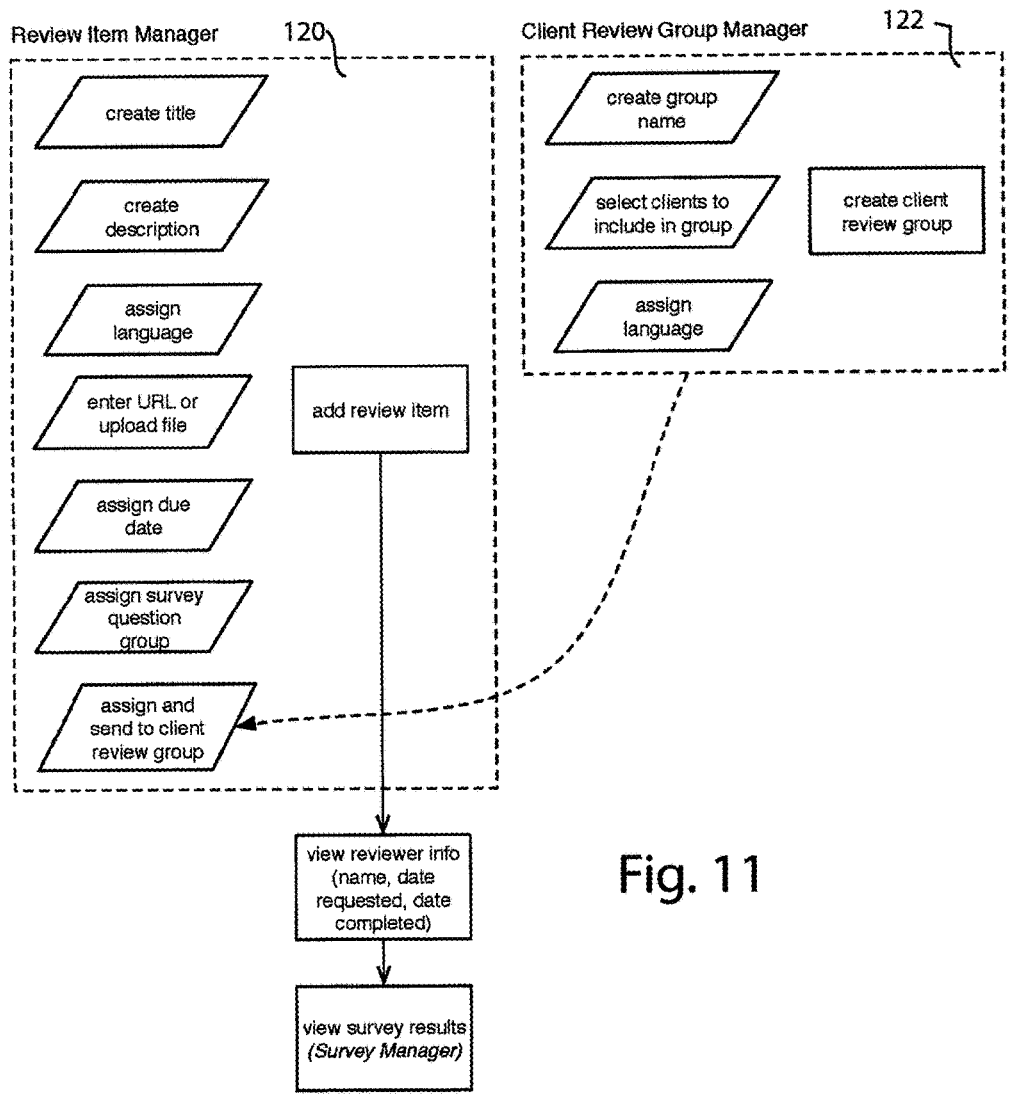
FIG. 11 is software object diagram depicting how the components of the client review management subsystem is constructed.

Shown in FIG. 11, the client review management subsystem employs the following manager objects:

Client Review Item Manager
Client Review Group Manager

The Client Review Item Manager 120 allows administrator to create and manage assets available upon which to gather date-specific user feedback using surveys created within the Survey Question Manager. The Client Review Group Manager 122 provides administrator with ability to view user emails who elected to participate as a client reviewer through the opt-in feature in the front end. Administrator can then create groups of selected users to actually review a specific asset created in the Client Review Item Manager.

System 11: Content Management

Figure 12:
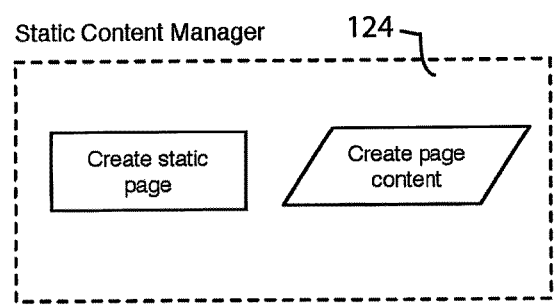
FIG. 12 is software object diagram depicting how the components of the static content management subsystem is constructed.

Shown in FIG. 12, the content management subsystem employs the following manager objects:

Static Content Manager
Page Manager
Site Map Manager

Figure 24:
FIG. 24 is an exemplary screen from the page manager as generated by the tool.

The Static Content Manager 124 provides capability for administrator to create and manage static site content pages. A Page Manager (not shown) provides editing options to created pages, including title, content, and search engine optimization information. With a Site Map Manager (not shown) the administrator can edit the navigation structure of the site by updating the Site Map. FIG. 24 shows an exemplary editing page generated by the page manager.

System 12: Component Management

The component management subsystem employs the following manager objects:

Component Availability Manager

A Component Availability Manager (not shown) allows administrator to activate and deactivate content, survey, impact and assessment management systems. The tool 50 displays a list of components to the administrator who then can select each to toggle that component's state from active to inactive. When active the component is included in the content delivery system data 66 loaded into the backend content management computer system 52. When inactive, the component is suppressed and is not included as part of the content delivery system data 66. The component availability manager maintains a record of the identity of the last person (administrator) to change the state of each component.

Front End FRAMEWORK

Figure 13:
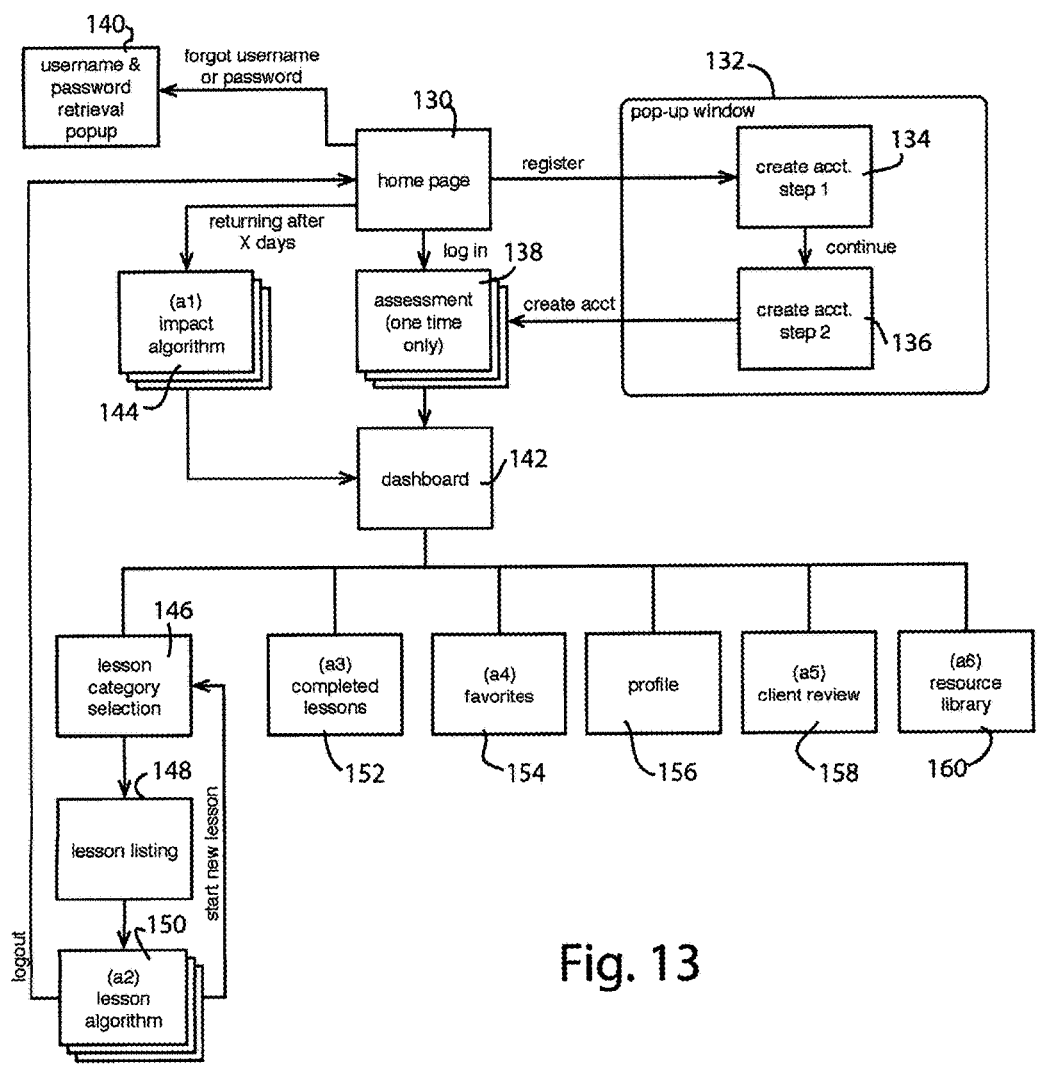
FIG. 13 is a flow diagram depicting an exemplary sequence of operation by the front end framework.

When published through the web server 54 (FIG. 1) the backend content management computer system 52 generates a front end framework with which the user interacts by using a browser installed on the client computer 70 (FIG. 1). FIG. 13 shows the overall flow of interaction with the front end framework. The user accesses the home page 130, which is generated according to the content delivery system data 66 stored in the backend content management computer system 52 (FIG. 1). If this is the first time the user has visited the site, the user is prompted to register with the site through a pop-up window 132. The pop-up window leads the enrolling user through a plurality of steps shown at 134 and 136 to create the account and choose a user name and password. As part of the registration process the backend content management computer system 52 may prompt the user to supply profile information, which is then stored in the backend content management computer system in association with the user's registered user name.

After registering with the site, the user logs in with user name and password upon accessing the home page 130. Because the user is now registered, the pop-up window 132 is not required and can therefore be suppressed.

The first time a registered user accesses the site, he or she will be requested to undergo an initial assessment as at 138. This initial assessment is generated based on the content delivery system data 66 stored within the backend content management computer system.

The specific areas of inquiry in this initial assessment are chosen by the administrator or content creator to be appropriate for the particular behavioral modification use case 66 that was developed using the tool 50. As illustrated in FIG. 13, the backend content management computer system stores the results of this initial assessment for each user of the system. These records are stored in the backend content management computer system, associated to each user's registered user name.

After the initial assessment, and thereafter when the user accesses the home page and logs in, the user is presented with a dashboard screen 142 through which the user can make a number of different interactive selections. In some cases the user will automatically be presented with the dashboard 142 upon logging in. However, the backend content management computer system 52 monitors each time the user accesses the system and selectively determines (based on the manner the content delivery system data 66 was programmed by the administrator or content creator) if the impact algorithm 144 should be executed. Generally, if the user is returning to the site after a predetermined length of time (e.g., a predetermined number of days) the content management system 52 causes an impact algorithm to be executed, to test whether the user has been compliant in executing the recommended steps prescribed to change his or her behavior following previous lesson completion. This impact algorithm is shown in more detail in FIG. 14.

Figure 15:
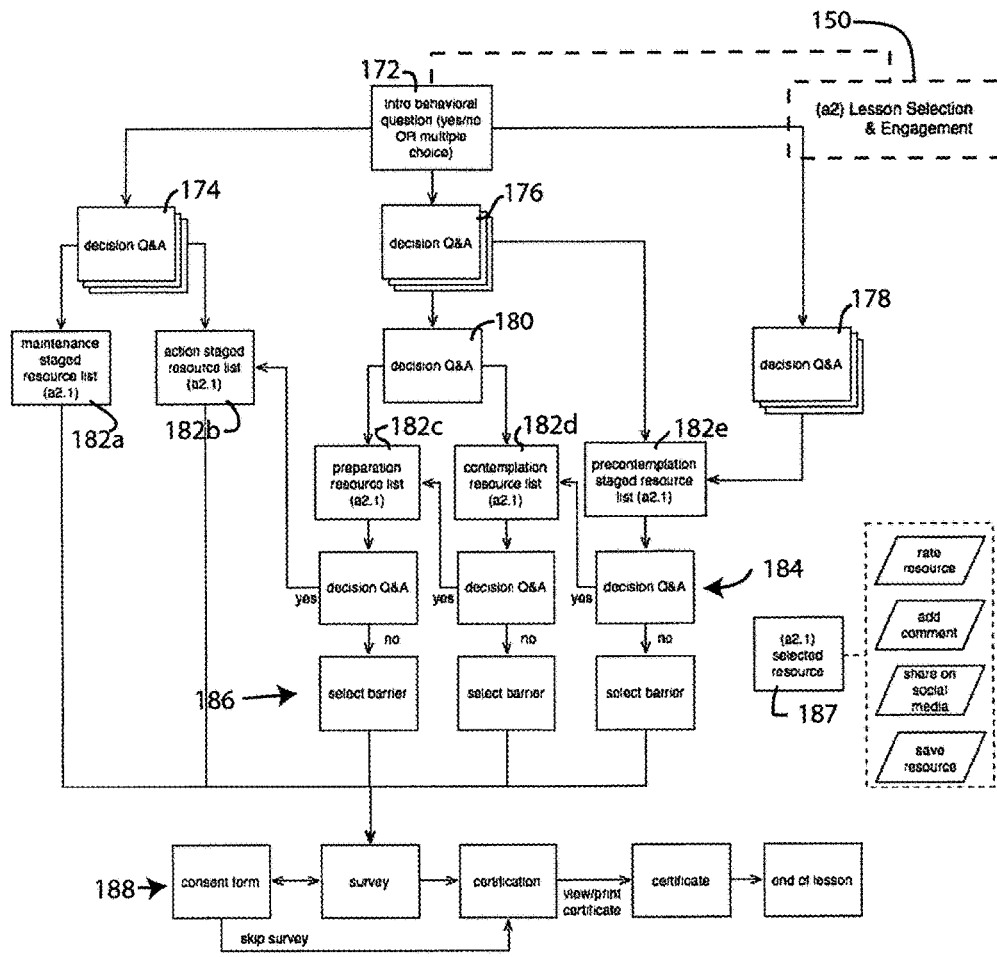
FIG. 15 is a flow diagram providing details of the lesson selection and engagement algorithm.

After responding to the impact algorithm at 144, the user is then delivered to the dashboard 142 where he or she can make selections among the choices offered at 146, 152, 154, 156, 158 and 160. Choosing "lesson category selection" as at 146 presents the user with a lesson listing as at 148. Upon choosing a lesson from the presented list, the user is then presented with a lesson algorithm as at 150. The lesson algorithms are based on programming embedded in the content delivery system data 66, as programmed by the administrator or content creator using the tool 50. Details showing how the lesson algorithm is constructed are shown in FIG. 15.

Figure 16:
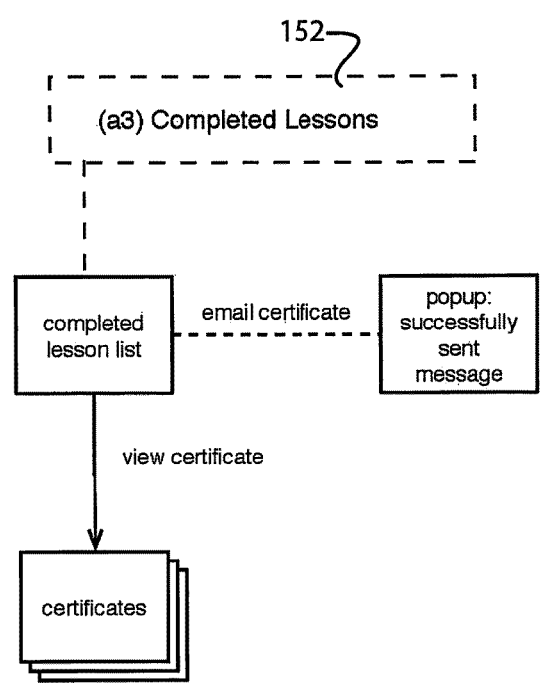
FIG. 16 is a flow diagram providing details of the completed lessons algorithm.

The user can elect to select "completed lessons" as at 152, allowing the user to review previously studied materials. The algorithm for such completed lesson review is shown in FIG. 16 and is also based on the content delivery system data 66.

Figure 17:
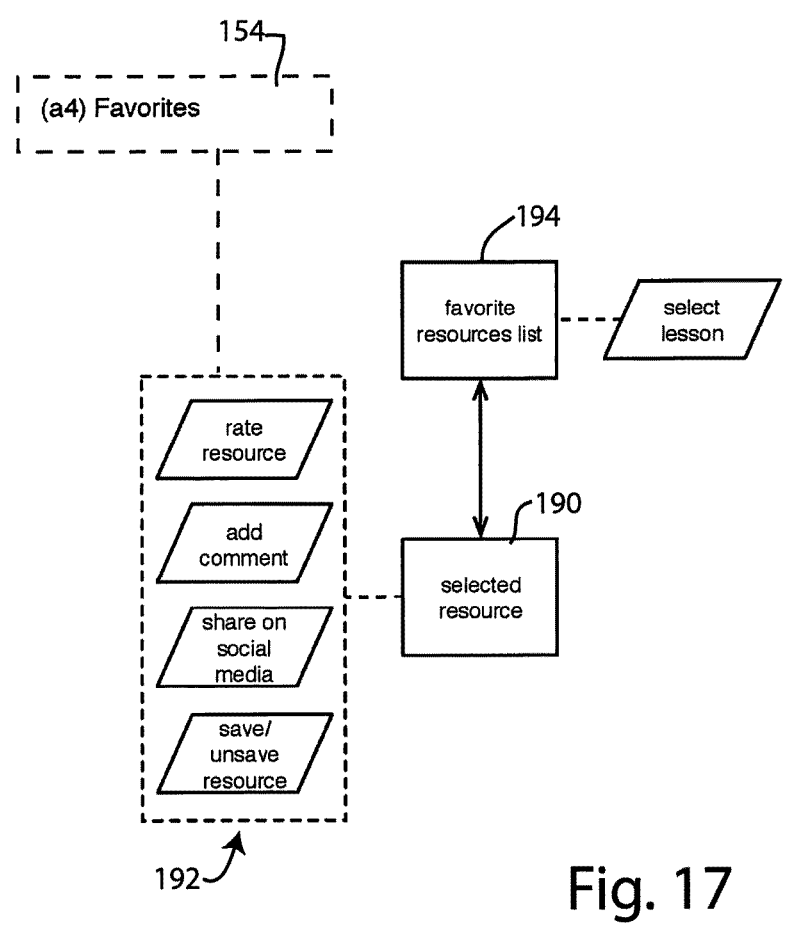
FIG. 17 is a flow diagram providing details of the favorites algorithm.

The user can elect to select "favorites" as at 154. This choice allows the user to add a lesson to a favorites list and to revisit these favorites. User favorites are stored within memory of the backend content management computer system 52, as part of a collection of user preferences and user profile information. The algorithm for implementing this function is shown in FIG. 17.

If desired the user can select the "profile" option as at 156. This option gives the user access to the stored profile information of that user, allowing the user the option to change profile information as desired.

Figure 18:
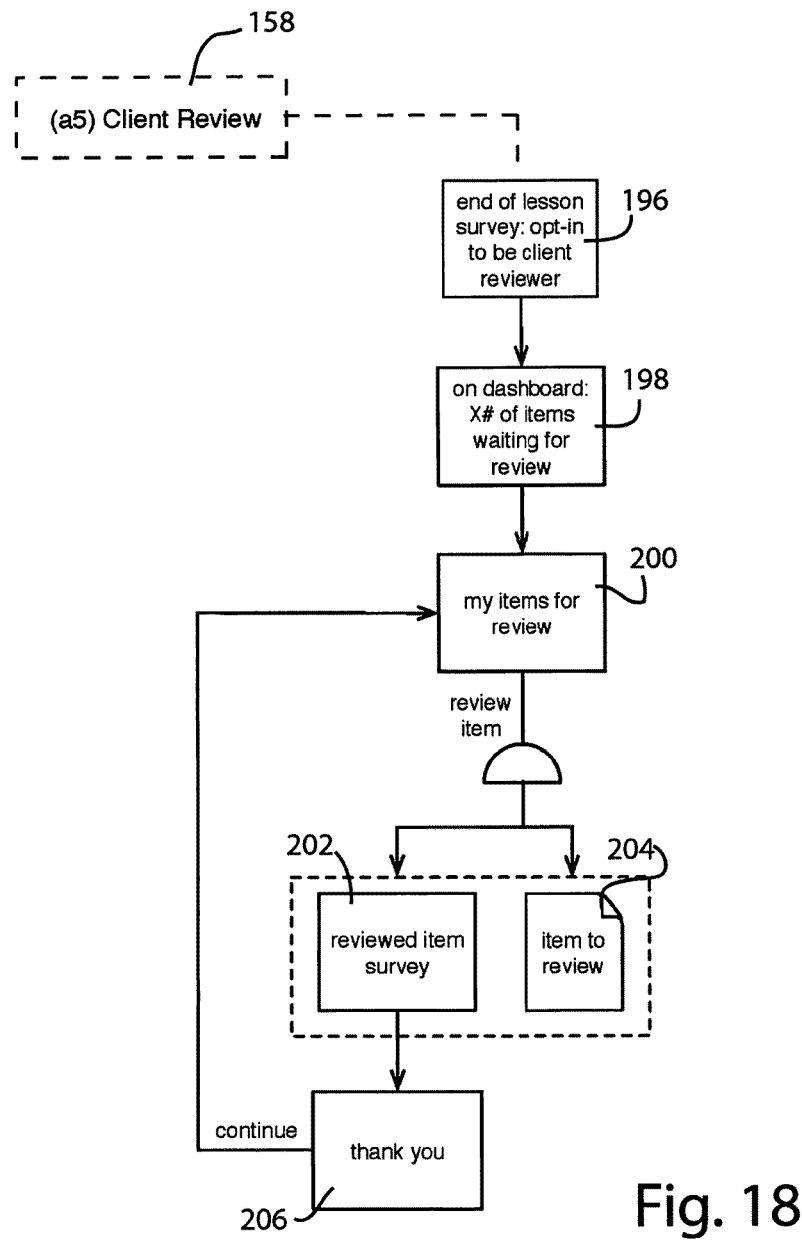
FIG. 18 is a flow diagram providing details of the client review algorithm.

Choosing the "client review" option, as at 158, allows the user to sign up for and provide feedback pertaining to administrator supplied assets. The algorithm for implementing this function is shown in FIG. 18.

Figure 19:
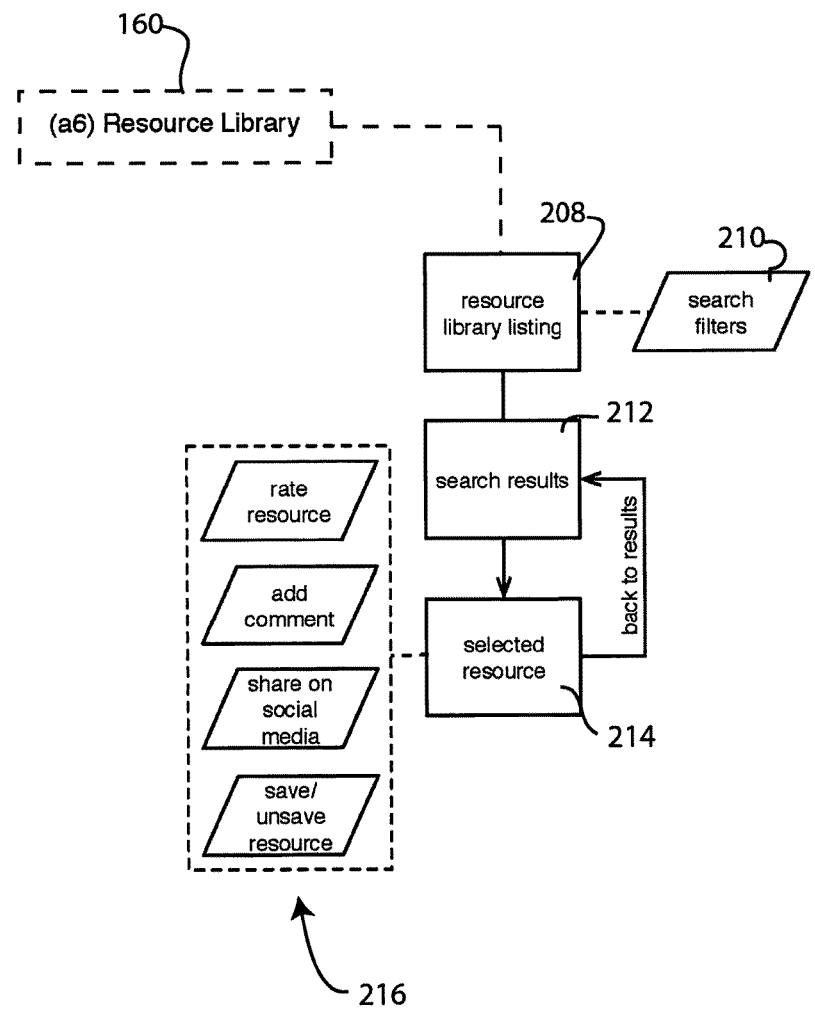
FIG. 19 is a flow diagram providing details of the resource library algorithm.

Finally, by choosing the "resource library" option, as at 160, the user can perform searches for additional education and behavior change resources as well as provide ratings of these resources and share through social networks. The algorithm for implementing this function is shown in FIG. 19.

To summarize, the backend content management system's front end framework, shown in FIG. 13, consists of seven functions users engage in with applications driven by the backend content management system. These seven functions are as follows:

Function 1: Registration and Profile Management

First time users register for an account. New users complete account and profile information. Registered users login to their account with username and password on subsequent visits to the site. Profile data can be edited by the user at any time once logged in to the site.

Function 2: Assessment

Users engage in a onetime only completion of assessment items that were developed using the Assessment Manager. Each page consists of data collection items designed to gather more information about the user. The number of assessment pages to complete is based on the assessment lesson built by the admin. Upon completion of the assessment, users are returned to the main dashboard.

Function 3: Lesson Selection and Engagement

From the main dashboard, users select lessons from lesson categories previously defined by the administrator in the backend content management system. Once selected the lesson and previously defined lesson objects (i.e., dialogue, virtual educator and associated gestures) appear following a response-dependent and transactional communication stream, between virtual educator and user, to move through the lesson toward an initial stage of readiness to change, which in accordance with the transtheoretical model of behavior change (TTM) can be (listed from less active engagement to more active engagement) pre-contemplation, contemplation, preparation, action, or maintenance. It is at this point that links and resources previously tagged in the Link Management System are displayed to the user at the completion of the dialogue-driven series of web pages. Only active links are within the pool of potential links randomly selected for each lesson link list page based on link characteristics that meet user lesson stage of change progression needs. If activated, the Smart System links will appear first in order of links displayed. Users have the ability to comment and rate links, save links to their favorites, and share with others via email or social media applications (e.g., Facebook®, Twitter®).

Once the user is done reviewing links, the virtual educator inquires, based upon the links that were delivered to the user, whether they are ready to move to progress to the next stage of readiness to change behavior as defined in the TTM. Lesson progression results in continued dialogue and access to links associated with the new stage of readiness to change. Stage progression can continue from earlier stages until the user reaches the action stage. Progression cannot continue to the maintenance stage or advance if starting in the action or maintenance stages, as is defined with the TTM a user must be actively engaging in a behavior for a period of time (typically 6 months) before progression to a maintenance stage can occur. When the user has completed the lesson, the survey page is displayed as well as any other pages as defined within the lesson. The user can be presented with the ability to opt-in to additional add-on applications if they exist. A certificate of completion page can be displayed for the user to print or email. It is at this point the lesson engagement has concluded.

Function 4: Impact Management

If activated, return users will be presented with an impact questionnaire if they login within an administrator defined date range following completion of their last lesson. The user will be presented with dialogue created within the Impact Manager to evaluate and direct their post-lesson success in moving the desired stage of change progression in the time period following lesson completion. A multiple choice questioning technique is used to determine the stage of readiness to change the user is at when they are presented with the impact lesson. If the user has not succeeded in meeting the administrator defined measure of success, a list of administrator defined stage of change barriers will be presented. Barrier links are displayed based on user selection of the specific barrier that is still preventing progression forward in stage of readiness to change. If in the impact questionnaire the user selects the action which depicts successful movement in stage of change progression, or if the user ended their previous lesson in the action of maintenance stage no barrier-related links will be displayed; however links to help the user maintain their desired goals will be displayed. Following review of links, the user will advance forward toward lesson selection as defined above.

Function 5: Survey and Data Collection

At the completion of the lesson the user will be presented with a survey. Data are collected and amassed in a database and tagged by the unique user identifier. Other data being collected include user site behavior, such as clicks and paths followed, time spent on various aspects of the site, and completed lessons.

Function 6: Client Review Management

Users are provided with the opportunity to sign up to serve in the capacity of an ad hoc reviewer. Users who elect this option submit their email to be registered into the client review user pool. An email notification will be sent to users indicating an item is ready for their review on their dashboard. Reviewers will login to their account, see a notification that there are one or more items to review, select an item for review, and complete the reviewed item survey. After completion of survey, the item is marked as "reviewed" on the "Items for Review" page.

Function 7: Accessing Resources and Completed Lessons

Users can access links that were saved to their favorites list, completed lessons, and a resource library available through the user dashboard. Other resources include a library of administrator curated resources that can be filtered by administrator defined link tag categories in the Link Management System of the backend content management system.

Figure 14:
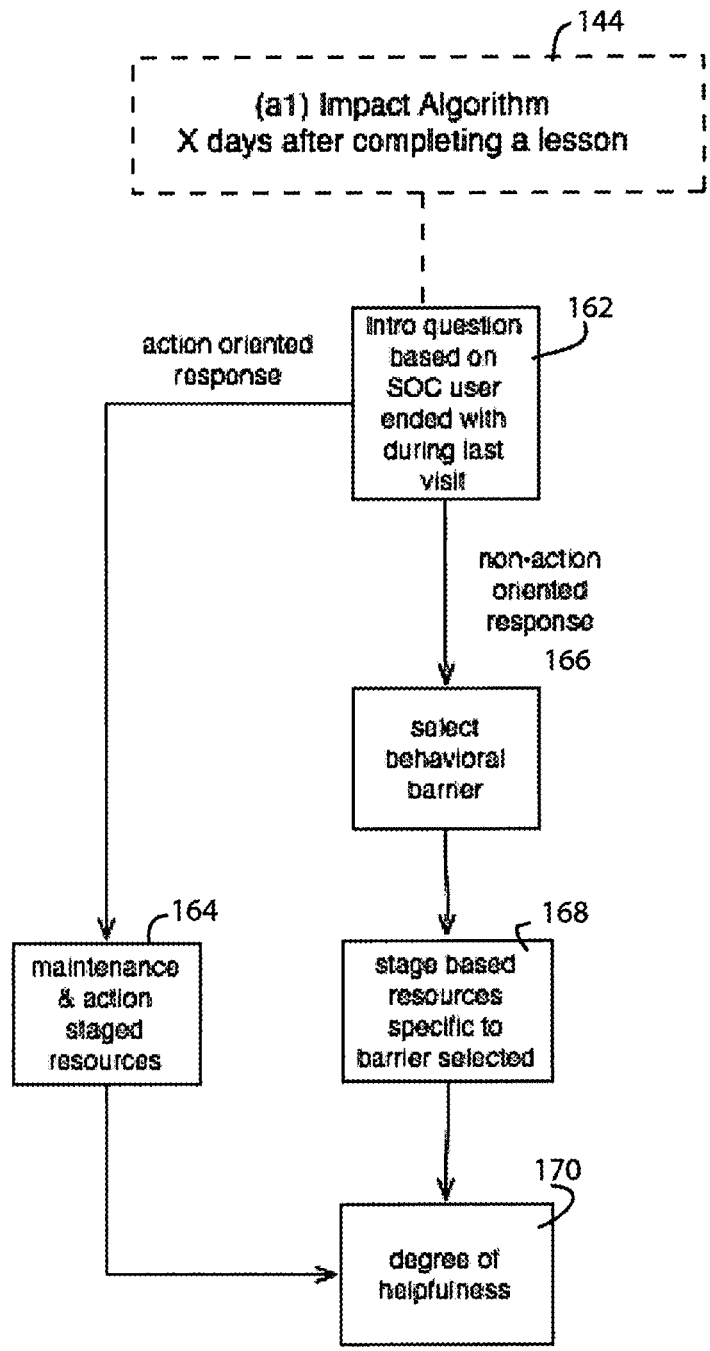
FIG. 14 is a flow diagram providing details of the impact algorithm.

Referring now to FIG. 14, the impact algorithm 144 is further described. Based on the content delivery system data 66 the backend content management computer system 52 presents an introductory question, as at 162, to the user via web server 54 and client computer 70, based on the stage of completion the user ended with during his or her last visit to the web site. The user's response is then analyzed by the backend content management computer system 52. If an action oriented response is provided, the impact algorithm instructs that maintenance and action staged resources are provided, as at 164. On the other hand, if the user provides a non-action oriented response, the algorithm 144 prompts the user to identify or select what behavioral barrier is blocking the user's advancement, as at 166. Then the algorithm recommends stage based resources, specific to the behavioral barrier selected, as at 168. Whether maintenance and action staged resources are provided as at 164, or stage based resources are provided at 168, the algorithm 144 concludes by requesting the user to indicate the degree of helpfulness, as at 170. The user's responses to the degree of helpfulness inquiry are then stored in the backend content management computer system for review by the administrator or content creator.

FIG. 15 shows the lesson selection and engagement algorithm 150 in greater detail. As illustrated, this algorithm supports a tree-structured or tiered approach whereby the user is assessed through a series of questions, the answers to which determine what resources are presented to the user. The algorithm 150 concludes with a survey and the award of a certificate for having completed the lesson.

The lesson selection and engagement algorithm 150 begins by presenting the user with an initial introductory question as at 172. The question can be yes/no or multiple choice. For illustration purposes, the algorithm 150 shown in FIG. 15 has three branches, to illustrate how a multiple choice question with three answers would be implemented. Of course, only two branches would be required for a yes/no question. Additional branches may also be included to support multiple choice questions having more than three answer choices.

Based on the user's answer to the initial introductory question, he or she is routed to a decision question and answer node, as at 174, 176 or 178, where additional questions and answers are provided. Based on the outcome of this question and answer session the user is then routed to one of a set of resources 182a-182e that are each designed by the administrator or content creator to help with a particular aspect of the user's behavioral modification campaign. For illustration purposes, the set of resources correspond to the following categories:

maintenance staged resources 182a
action staged resources 182b
preparation resources 182c
contemplation resources 182d
pre-contemplation resources 182e.

After the appropriate resources have been presented, based on the question and answer "triage" session, a set of decision question are presented and the answers assessed as at 184. This may route the user to review other resources, or may route the user to identify or select a barrier as at 186. Generally a barrier corresponds to a reason why the particular user is blocked or prevented from advancing.

As seen in FIG. 15, the decision question and answer stage 184 is designed in cascade fashion, so that responses originating from the pre-contemplation stage result in the user being routed to the contemplation stage, and then to the preparation stage, and then finally to the action stage.

In addition to its primary function of leading the user through a series of training and assessment resources, the algorithm 150 also provides the option, shown at 187, for the user to rate resources, add comments, share information about the resource on social media and save the resource as a preference for later review.

At the end of the training session, the algorithm 150 leads the user to a survey section 188 where a survey is conducted, with consent form if required, culminating in issuance of a certificate showing that the user completed the prescribed lesson(s).

FIG. 16 shows the completed lessons algorithm 152 in more detail. As illustrated, this algorithm gives the user a choice to see a list of completed lessons, view a certificate of completion on line or email the certificate to someone.

FIG. 17 shows the favorites algorithm 154 in greater detail. As illustrated, this algorithm gives the user the ability to select a resource as at 190, provide user-supplied information about the resource, as at 192, such as rating the resource, adding a comment, sharing information about the resource on social media and saving (or unsaying) the information provided about selected resource. If desired the user can also save the selected resource to the user's favorite resources list 194.

FIG. 18 shows the client review algorithm 158 in greater detail. As illustrated if the user has opted-in to be a client reviewer at 196 the backend content management computer system 52 (FIG. 1) generates a list of items for review, as at 198. The user can then select an item from the list as at 200. The system 52 then responds either with a survey 202 or a presentation of an item to review 204. Upon completion of the survey or item review, the review algorithm 158 thanks the user for his or her participation as at 206, whereupon the algorithm causes the system 52 to loop back to step 200 where any remaining items are listed.

FIG. 19 shows the resource library algorithm 160 in greater detail. Following this algorithm the backend content management computer system presents a resource library listing at 208, which may be filtered by one or more search filters 210 as specified by the user. With the filters applied, the search results are displayed as at 212. From the search results the user may select one of the displayed resources retrieved. From there the user can perform a variety of different operations, such as rating the resource, adding comments, sharing information about the resource on social media, as depicted collectively at 216. The any operations performed by the user at 216 can either be saved, causing the operations to take effect, or unsaved, causing the effect of those operations to be deleted or abandoned.

Figure 25:
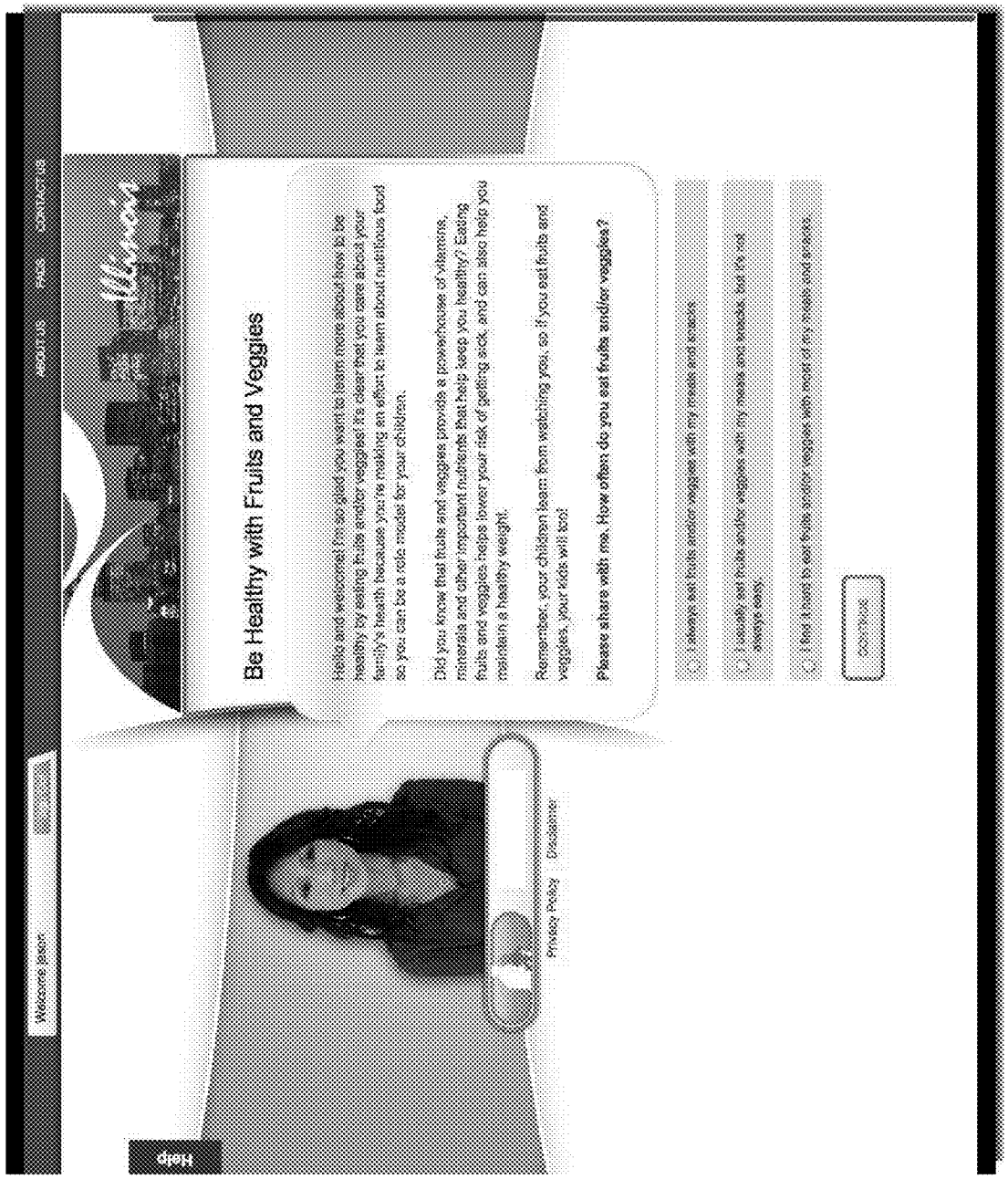
FIG. 25 is an exemplary screen displayed by a web server in accordance with information produced by the backend content management computer system.
Figure 26:
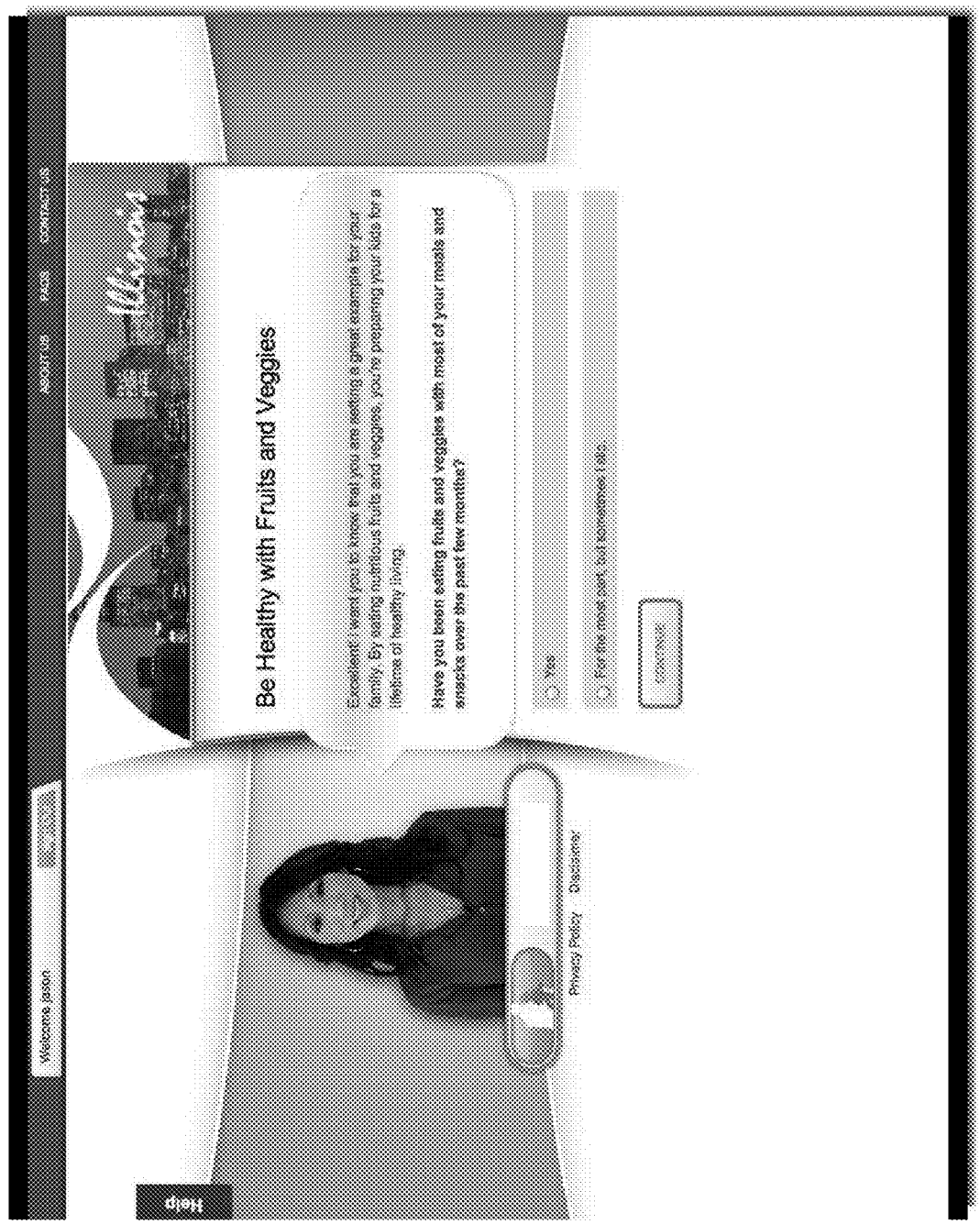
FIG. 26 is another exemplary screen displayed by a web server in accordance with information produced by the backend content management computer system.

By way of further illustration, FIGS. 25 and 26 show an exemplary welcome screen and follow-on screen as presented on the client computer 70 based on the content delivery system data 66 created by tool 50. In this example, the site's goal is to encourage the user to become healthier by eating more fruits and vegetables. Note how the facial expression of the virtual educator changes between FIGS. 25 and 26.

Figure 27:
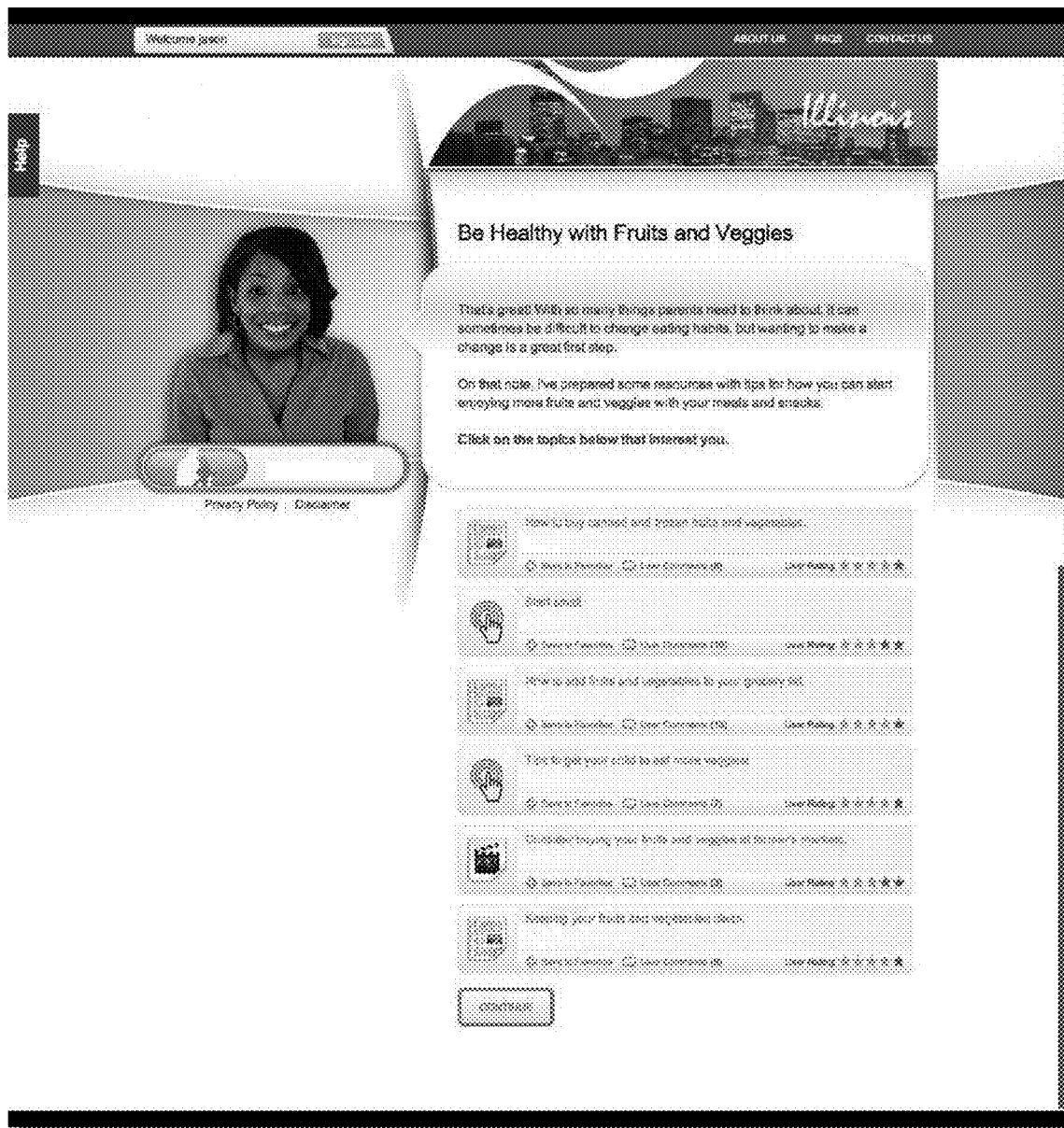
FIG. 27 is another exemplary screen displayed by a web server in accordance with information produced by the backend content management computer system.

FIG. 27 shows another exemplary screen featuring a graphical image of the virtual educator and also displaying a list of associated links as mediated by the link manager.

In the preferred embodiment each of the managers (such as the lesson manager 74, the virtual educator manager 78, the link manager, 84 and the impact manager 90a and 90b) are object oriented modules or objects that have data structures that map to a relational database. Each of the managers is implemented using a framework built using the Microsoft .NET 4.0 framework, written in c#, and powered by a SQL Server 2008 R2 database. The Entity framework, which is part of the Microsoft .NET suite, provides the relational mapping of the object oriented code to the database. It will of course be understood that the .NET programming code is stored in non-transitory computer-readable memory accessed by the processor of a computer, which executes the instructions dictated by that programming code. The SQL Server database is likewise stored in non-transitory computer-readable memory accessed by the processor of a computer, which executes the instructions dictated by that programming code.

Computer Implementation Details of Exemplary Embodiment

Technical Details Common to all (or Most) Manager Embodiments

In accordance with the .NET framework, the managers are preferably implemented in a layered architecture. Each of the managers employed in the behavioral intelligence framework may be implemented in this fashion. The layered architecture includes a data access layer. The data access layer is responsible for storing and retrieving data from the data storage system, in this case the SQL Server database. Communicating with data access layer is the business logic layer. The business logic layer contains the specific code (e.g., written in c#) that defines how each particular manager behaves. Communicating with the business logic layer is the presentation layer. The presentation layer governs the user interface, i.e., what the user sees when he or she uses the system and how the user can interact with the system.

Each of the managers is programmed to process the data that are germane to that manager's function(s) as shown in the respective object diagrams of FIGS. 2-12. To give each manager the ability to handle its data, the managers are all preferably provided with at least some of the following consistent set of functionality to create, read, update and delete. These basic data handling capabilities, if desired, may be implemented through inheritance, whereby the class to provide create, read, update and delete functionality (CRUD functionality) is written once and then inherited by each of the object-oriented classes that define each individual manager. Of course, if a particular manager does not require a complete set of CRUD functionality, it can be implemented to inherit fewer than all of the CRUD functions or the managers can each be explicitly written (without relying on inheritance).

Technical Details of Lesson Manager Embodiment

At the core of the backend content management computer system is the lesson manager 74. A lesson starts by presenting a front end user with a series of questions. The answers provided by the user guide the system to eventually produce recommended material for user review. The goal of every lesson is to evaluate where in the Stage of Change a user is at for a specific concept or topic and to provide instructional material that can help advance them to the next stage of change.

Figure 29:
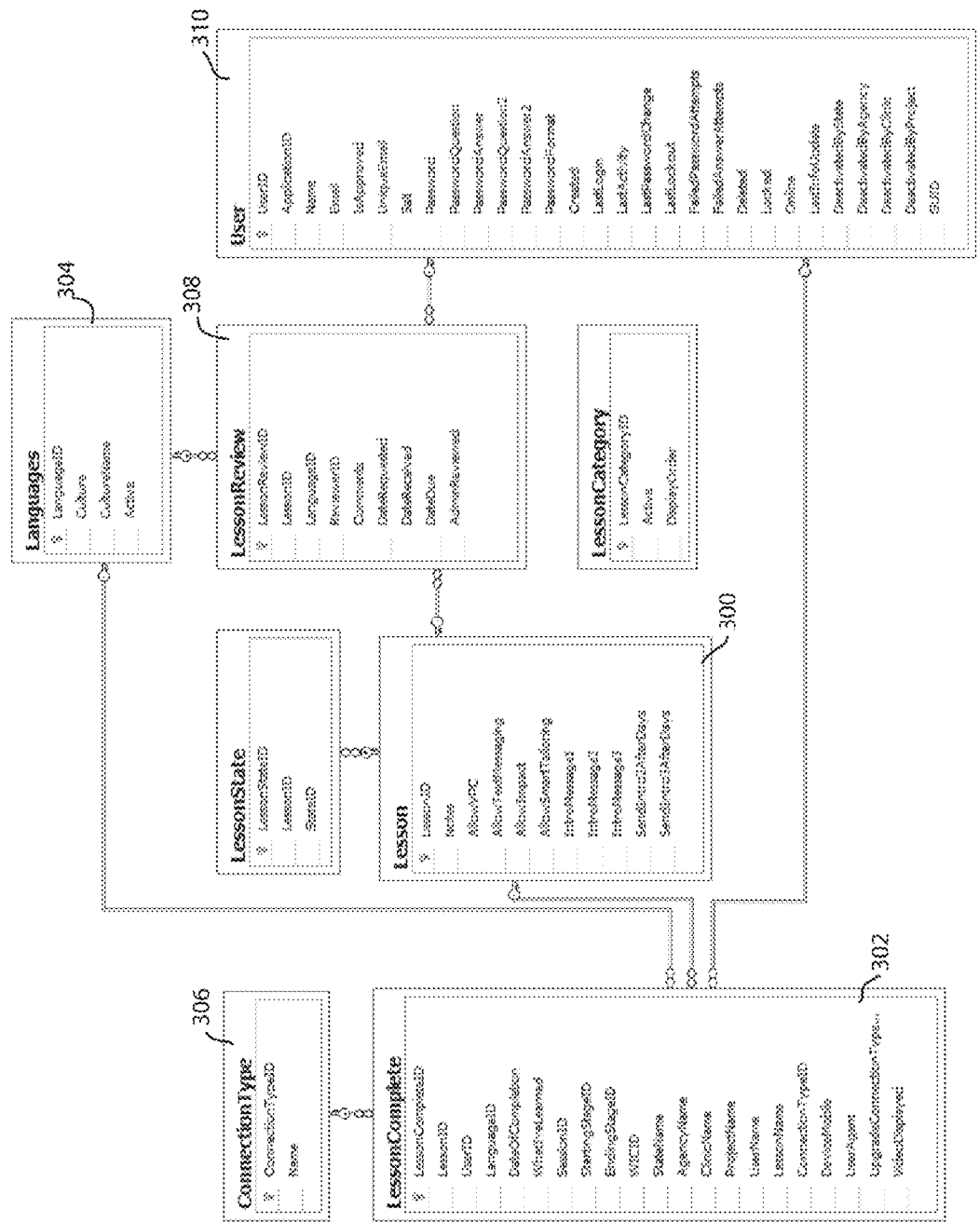
FIG. 29 is a data structure diagram illustrating the lesson data structure used by the lesson manager and other managers within the computer-implemented system.

The lesson manager works in conjunction with the lesson data structure, shown at 300 in FIGS. 29 and 30*a*. The lesson manager uses this lesson data structure 300 to configure each lesson by storing attributes on how the lessons are presented, based on configuration by the administrator or content creator as discussed above. FIG. 29 shows how the lesson data structure or Lesson table 300 is related to the other data structures that control how the lessons are presented. In this regard, the LessonComplete table 302 stores the state of completed lessons. The LessonComplete table 302 is linked (via primary and foreign key relationships) to the Lesson table 300 via the LessonID. The LessonComplete table 302 is also linked, by LanguageID to the Languages table 304, and by ConnectionTypeID to the ConnectionType table 306. Similarly the LessonReview table 308 is linked by LessonReviewID to the Lesson table 300. The dates on which a lesson was requested and received, as well as due dates and other administrative review details are stored in the Lesson Review table.

Note that the Lesson Review table 308 is linked to the User table 310. Through this link details about a particular user (e.g. a reviewer prior to making lessons available to the public) are linked to the lessons administered by the lesson manager 74.

In the preferred embodiment, lessons are organized as pages. The administrator or content creator adds, edits and deletes pages associated with a lesson using CRUD functionality. For this purpose a paged listing of lessons is stored in the database and displayed on the screen through a Flash interface to provide the administrator with a GUI interface to manage the lesson structure. The administrator is able to select a specific lesson to modify or delete. Additionally, the administrator can create a new lesson.

To effect this functionality the lesson manager utilizes the page data structure shown in FIGS. 30*a* and 30*b*. FIGS. 30*a* and 30*b* are connected to each other as shown by the (a, b, c, d) labels on the edge of each page. At the core of the page data structure is the Page table 312. The Page table 312 is linked to the Lesson table 300 through the LessonID attribute. In the preferred embodiment there can be a variety of different page types. This is implemented using a relational table PageType 314 which is linked to the Page table 312 via the PageTypeID attribute.

Each lesson is represented by a series of pages. Some lessons might only be a dozen pages in size. Other lessons could be over 30 pages in size. These pages within a lesson might present to the user information, a question, links with content to follow, or even a survey. Each page type has its own custom set of variables needed to manipulate the page content and push the user through the stages of change.

Presentation Layer within the Lesson Manager

A core element of the lesson manager is the graphical user interface component that enables pages to be manipulated. This includes the ordering of the pages in the lesson algorithm as well as the actual variables associated with each page.

In the illustrated embodiment the presentation of the lesson itself is handled with a Flash object. On page load and after asynchronous updates to the page are made, XML is loaded as a Flash variable and read by the object. Flash converts the XML into a series of boxes indicating the relationship each page within the lesson has to each other. For easier readability, pages are color coded. This way the user can distinguish multiple entry points to a single page.

When pages within the Flash object are clicked, events are triggered and an associated jQuery method is called. This in turn manipulates the page or makes a reference to a web service to interact with the database accordingly. Each update to the lesson's page algorithm or layout is automatically saved to the staging version of the lesson. To prevent broken algorithms from being pushed live to the end user, a test is run to make sure that no dead ends can be reached. If a dead end is detected, the administrator or content creator is notified to permit making further updates to the lesson prior to pushing the changes live.

To ease the administrator's or content creator's job of creating and revising content, a keyword search is available at the listing pages to compare like terms across a variety of database columns including the lesson's name and description. In addition, the lesson manager includes a filter mechanism that allows filtered searches to be conducted across the database columns (attributes) of the tables within the lesson data structure of FIG. 29 and the page data structure of FIGS. 30*a* and 30*b*. Other filter options are also present, including the ability to filter on lessons that have text messaging enabled. In a preferred embodiment, filtering is performed using JavaScript jQuery. In the illustrated embodiment filtering is implemented using the Knockout.js jQuery library. The user updates the sort direction of a column on the screen. As a result, an asynchronous call to a static WebMethod is implemented in the code behind the page. This in turn makes the appropriate call to the database and updates portions of the page as needed.

When updates are being made to this module, a pair of session variables track which instance of the lesson to update. The administrator or content creator can decide whether English content, Spanish content, or some other language content of the lesson is manipulated. This may be handled via a drop-down box in the header of the page. Similarly, the database can store a "staging" version of the lesson as well as a "live" version. When the administrator or content creator decides to toggle between English vs. Spanish, for example, the session variable is updated. This variable is then passed through to each CRUD call as an additional attribute to select the correct record for manipulation.

In addition to the administrator having access to the lessons for management reasons, "reviewers" also interact with the Flash GUI. Reviewers are individuals that need to provide feedback and approve the lesson's algorithm prior to it being made available to the end user. Reviewers are first limited to only lessons needing their input. When presented with a lesson ready for review, this role is also presented with a limited set of functionality. They are able to interact with the Flash GUI, clicking on pages and viewing various sets of content on the right-hand side of the page. But, the content is modified to only show them what they need to see. This role can make comments about each page and see other comments left by previous reviewers. But, they cannot update the algorithm or any of the page variables themselves.

Technical Details of Link Manager Embodiment

The recommended material is uniquely selected based on a wide variety of factors, this includes user demographic data. For example, the system tracks if the user is pregnant or not and it tracks the age of the user. Based on the historical success of other individuals that most closely resemble this user's demographics, the system rates the likelihood that a piece of recommended material (a "Link") will advance the user to the next stage of change. This way, links that are the most likely to evoke change are at the top of the list where the user is typically going to click first.

The link selection process utilizes the Bayesian network (BN) model, discussed in connection with FIG. 28, to detect a high likelihood of failure to progress in stage of change for a given lesson. The Bayesian network model stores the probability distribution of a collection of variables that each contribute to the posterior probability of stage progression. The posterior probability of a random event or an uncertain proposition (e.g. whether or not user will progress in stage) is the conditional probability that is assigned after the relevant evidence (distribution of key variables) is taken into account.

The link manager employs an empty matrix model for storing the success of each link within the database. A single entry represents a unique combination of demographic data. By way of example, FIG. 31 displays a Bayesian network model that might be used in a behavior intelligence framework to teach improved childcare techniques to mothers learning to feed and care for their children. Pregnant mothers between the ages of 30-35 clicking on the link "Why Breastfeed?" would represent a single node. The success rate of this case is then tracked as well as the total number of views. When another user matching these demographics arrives, this previous success rate of all links will be measured to provide the user with the greatest chance of progression.

In one embodiment disclosed here the listing pages use knockout.js to asynchronously retrieve the listing information from the page's web page code. Serving that asynchronous retrieval is a method, set up as a web method, so that it is treated and used as a web service method and can be accessed by AJAX. The following program code further illustrates how the link manager may be implemented as an interacting combination of server side code (e.g. implemented as active server page asp code) and business logic code (e.g., implemented as C# code).

ASP Code:

```
<%@ Page Language="C#" MasterPageFile="~/Admin/admin.master" AutoEventWireup="true"
Inherits="AdminLink" CodeFile="admin-link.aspx.cs" %>
<asp:Content ContentPlaceHolderID="ContentWindow" runat="server">
    <%--The markup for the Header (title, breadcrumbs, and search panel) can be found in the
BaseListingPage--%>
    <asp:PlaceHolder runat="server" ID="uxHeader"></asp:PlaceHolder>
    <%--The markup for pagination can be found in the BaseListingPage--%>
    <asp:PlaceHolder runat="server" ID="uxFilterPlaceHolder">
        <div class="column">
            <label for="<%= uxSearchLesson.ClientID %>">
                Lesson Name</label>
            <asp:DropDownList runat="server" ID="uxSearchLesson"
AppendDataBoundItems="true" data-bind="value: pageFilter.FilterLessonID">
                <asp:ListItem Text="--Select a Lesson--" Value=""></asp:ListItem>
            </asp:DropDownList>
            <label for="<%= uxSearchSOC.ClientID %>">
                Stage of Change</label>
            <asp:DropDownList runat="server" ID="uxSearchSOC"
AppendDataBoundItems="true" data-bind="value: pageFilter.FilterStageOfChangeID">
                <asp:ListItem Text="--Select a Stage of Change--" Value=""></asp:ListItem>
            </asp:DropDownList>
        </div>
        <div class="column">
            <label for="<%= uxSearchStatus.ClientID %>">
                Status</label>
            <asp:DropDownList runat="server" ID="uxSearchStatus"
AppendDataBoundItems="true" data-bind="value: pageFilter.FilterLinkLinkStatusID">
                <asp:ListItem Text="--Select a Status--" Value=""></asp:ListItem>
            </asp:DropDownList>
            <label for="<%= uxSearchApprovalStatus.ClientID %>">
```

```
                    Approval Status</label>
                    <asp:DropDownList runat="server" ID="uxSearchApprovalStatus"
AppendDataBoundItems="true" data-bind="value: pageFilter.FilterLinkLinkApprovalStatusID">
                        <asp:ListItem Text="--Select an Approval Status--" Value=""></asp:ListItem>
                    </asp:DropDownList>
                </div>
                <div class="column">
                    <label for="<%= uxSearchLinkType.ClientID %>">
                        Link Type</label>
                    <asp:DropDownList runat="server" ID="uxSearchLinkType"
AppendDataBoundItems="true" data-bind="value: pageFilter.FilterLinkLinkTypeID">
                        <asp:ListItem Text="--Select a Link Type--" Value=""></asp:ListItem>
                    </asp:DropDownList>
                    <label for="<%= uxSearchBarrierLink.ClientID %>">
                        Barrier Links</label>
                    <asp:DropDownList runat="server" ID="uxSearchBarrierLink"
AppendDataBoundItems="true" data-bind="value: pageFilter.FilterLinkBarrierLink">
                        <asp:ListItem Text="--Barrier Links--" Value=""></asp:ListItem>
                        <asp:ListItem Text="Barrier Links" Value="true"></asp:ListItem>
                        <asp:ListItem Text="Not Barrier Links" Value="false"></asp:ListItem>
                    </asp:DropDownList>
                </div>
        </asp:PlaceHolder>
        <table class="listing" data-bind="visible: listings( ).length > 0">
            <thead>
                <tr>
                    <th class="first wordWrap">
                        <a href="#" class="sort" data-bind="css:{ascending: sortField( )
== 'URL' && sortDirection( ), descending: sortField( ) == 'URL' && !sortDirection( )}, click:
function( ){listingModel.setSort('URL')}">URL</a>
                    </th>
                    <th>
                        Characteristics
                    </th>
                    <th>
                        <a href="#" class="sort" data-bind="css:{ascending: sortField( )
== 'LinkStatus.Name' && sortDirection( ), descending: sortField( ) == 'LinkStatus.Name' &&
!sortDirection( )}, click: function( ){listingModel.setSort('LinkStatus.Name')}">Status</a>
                    </th>
                    <th>
                        <a href="#" class="sort" data-bind="css:{ascending: sortField( )
== 'LinkApprovalStatus.Name' && sortDirection( ), descending: sortField( ) ==
'LinkApprovalStatus.Name' && !sortDirection( )}, click:
function( ){listingModel.setSort('LinkApprovalStatus.Name')}">Approval
                            Status</a>
                    </th>
                    <th style="width: 120px;">
                        Options
                    </th>
                </tr>
            </thead>
            <tbody data-bind="foreach: listings">
                <tr data-bind="css:{odd:index( ) % 2 == 0}">
                    <td class="first wordWrap" data-bind="prependHTML:AlternateUpload != null
? URL : "">
                        <!-- ko if:AlternateUpload == null-->
                        <a target="_blank" data-bind="attr:{href:URL},html:URL"></a>
                        <!-- /ko -->
                    </td>
                    <td data-bind="html:LessonLinkText">
                    </td>
                    <td data-bind="html:LinkStatusName">
                    </td>
                    <td data-bind="html:ApprovalStatus != " ? ApprovalStatus : 'Not sent for
approval'">
                    </td>
                    <td>
                        <a data-bind="attr:{href:linkToEditPage + Id +
listingModel.returnString( )}" class="icon edit">Edit</a>
                        <a href='#' class="icon delete or" data-bind="click:
function( ){if(confirm('Are you sure you want to delete this link?'))deleteRecord( );}">Delete</a>
                        <input type='hidden' data-bind="value:Id" />
                    </td>
                </tr>
            </tbody>
        </table>
        <h4 class="indent paddingTop" data-bind="visible: listings( ).length == 0">There are no
Links to edit. Add a Link by clicking the Add New button above.</h4>
</asp:Content>
```

```
<asp:Content runat="server" ContentPlaceHolderID="PageSpecificJS">
    <asp:Literal runat="server" ID="uxJavaScripts" Text="~/scripts/jquery.tooltip.pack.js" />
    <script type="text/javascript">
        pageFilter.FilterLessonID = ko.observable("");
        pageFilter.FilterStageOfChangeID = ko.observable("");
        pageFilter.FilterLinkLinkStatusID = ko.observable("");
        pageFilter.FilterLinkLinkApprovalStatusID = ko.observable("");
        pageFilter.FilterLinkLinkTypeID = ko.observable("");
        pageFilter.FilterLinkBarrierLink = ko.observable("");
        pageFilter.FilterLessonID.subscribe(UseFilters);
        pageFilter.FilterStageOfChangeID.subscribe(UseFilters);
        pageFilter.FilterLinkLinkStatusID.subscribe(UseFilters);
        pageFilter.FilterLinkLinkApprovalStatusID.subscribe(UseFilters);
        pageFilter.FilterLinkLinkTypeID.subscribe(UseFilters);
        pageFilter.FilterLinkBarrierLink.subscribe(UseFilters);
        appendToListing = function (index, item, thisListing) {
            thisListing.Id = item.LinkID;
            thisListing.AlternateUpload = item.AlternateUpload;
            thisListing.ApprovalStatus = item.ApprovalStatus;
            thisListing.LessonLinkText = item.LessonLinkText;
            thisListing.LinkStatusName = item.LinkStatusName;
            thisListing.URL = item.URL;
        }
        afterLoad = function( ){
            $('span').tooltip({
                track: true
            });
        }
        <% if (!String.IsNullOrEmpty(uxSearchLesson.SelectedValue) ||
!String.IsNullOrEmpty(uxSearchSOC.SelectedValue) ||
!String.IsNullOrEmpty(uxSearchStatus.SelectedValue) ||
!String.IsNullOrEmpty(uxSearchApprovalStatus.SelectedValue) ||
!String.IsNullOrEmpty(uxSearchLinkType.SelectedValue) ||
!String.IsNullOrEmpty(uxSearchBarrierLink.SelectedValue)){ %>
        listingModel.readyToReloadListing(false);
        $(document).ready(function ( ) {
            pageFilter.FilterLessonID("<%=uxSearchLesson.SelectedValue%>");
            pageFilter.FilterStageOfChangeID("<%=uxSearchSOC.SelectedValue%>");
            pageFilter.FilterLinkLinkStatusID("<%=uxSearchStatus.SelectedValue%>");
    pageFilter.FilterLinkLinkApprovalStatusID("<%=uxSearchApprovalStatus.SelectedValue%>");
            pageFilter.FilterLinkLinkTypeID("<%=uxSearchLinkType.SelectedValue%>");
            pageFilter.FilterLinkBarrierLink("<%=uxSearchBarrierLink.SelectedValue%>");
            listingModel.readyToReloadListing(true);
        });<%} %>
    </script>
</asp:Content>
Business Logic Code:
public partial class AdminLink : BaseListingPage
{
    protected override void SetCssAndJs( )
    {
        m_AdditionalJavaScriptFiles = uxJavaScripts;
    }
    protected override void OnInit(EventArgs e)
    {
        //Passing control references to base class
        m_Header = uxHeader;
        m_DefaultSortField = "URL";
        m_LinkToEditPage = "admin-link-edit.aspx?id=";
        m_FiltersPlaceHolder = uxFilterPlaceHolder;
        m_ClassName = "Link";
        m_ColumnNumberToMakeLink = 0;
        base.OnInit(e);
    }
    protected override void Page_Load(object sender, EventArgs e)
    {
        base.Page_Load(sender, e);
        if (!IsPostBack)
        {
            uxSearchApprovalStatus.DataSource = LinkApprovalStatus.GetAll( );
            uxSearchApprovalStatus.DataTextField = "Name";
            uxSearchApprovalStatus.DataValueField = "LinkApprovalStatusID";
            uxSearchApprovalStatus.DataBind( );
            uxSearchLesson.DataSource = Lesson.LessonPageWithLocalizedContent(0, 0,
"", "Title", true, Helpers.GetDefaultLanguageID( ));
            uxSearchLesson.DataTextField = "Title";
            uxSearchLesson.DataValueField = "LessonID";
            uxSearchLesson.DataBind( );
```

```
            uxSearchLinkType.DataSource = LinkType.GetAll( );
            uxSearchLinkType.DataTextField = "Name";
            uxSearchLinkType.DataValueField = "LinkTypeID";
            uxSearchLinkType.DataBind( );
            uxSearchSOC.DataSource = StageOfChange.GetAll( );
            uxSearchSOC.DataTextField = "Stage";
            uxSearchSOC.DataValueField = "StageOfChangeID";
            uxSearchSOC.DataBind( );
            uxSearchStatus.DataSource = LinkStatus.GetAll( );
            uxSearchStatus.DataTextField = "Name";
            uxSearchStatus.DataValueField = "LinkStatusID";
            uxSearchStatus.DataBind( );
            if (!String.IsNullOrEmpty(Request.QueryString["FilterLinkLinkApprovalStatusID"])
&&
uxSearchApprovalStatus.Items.FindByValue(Request.QueryString["FilterLinkLinkApprovalStatusI
D"]) != null)
     uxSearchApprovalStatus.Items.FindByValue(Request.QueryString["FilterLinkLinkApproval
StatusID"]).Selected = true;
            if (!String.IsNullOrEmpty(Request.QueryString["FilterLessonID"]) &&
uxSearchLesson.Items.FindByValue(Request.QueryString["FilterLessonID"]) != null)
     uxSearchLesson.Items.FindByValue(Request.QueryString["FilterLessonID"]).Selected =
true;
            if (!String.IsNullOrEmpty(Request.QueryString["FilterLinkLinkTypeID"]) &&
uxSearchLinkType.Items.FindByValue(Request.QueryString["FilterLinkLinkTypeID"]) != null)
     uxSearchLinkType.Items.FindByValue(Request.QueryString["FilterLinkLinkTypeID"]).Selec
ted = true;
            if (!String.IsNullOrEmpty(Request.QueryString["FilterStageOfChangeID"]) &&
uxSearchSOC.Items.FindByValue(Request.QueryString["FilterStageOfChangeID"]) != null)
     uxSearchSOC.Items.FindByValue(Request.QueryString["FilterStageOfChangeID"]).Select
ed = true;
            if (!String.IsNullOrEmpty(Request.QueryString["FilterLinkLinkStatusID"]) &&
uxSearchStatus.Items.FindByValue(Request.QueryString["FilterLinkLinkStatusID"]) != null)
     uxSearchStatus.Items.FindByValue(Request.QueryString["FilterLinkLinkStatusID"]).Select
ed = true;
            if (!String.IsNullOrEmpty(Request.QueryString["FilterLinkBarrierLink"]) &&
uxSearchBarrierLink.Items.FindByValue(Request.QueryString["FilterLinkBarrierLink"]) != null)
     uxSearchBarrierLink.Items.Find ByValue(Request.QueryString["FilterLinkBarrierLink"]).Sele
cted = true;
            m_SearchCancelButton.Visible =
!String.IsNullOrEmpty(Request.QueryString.ToString( )) || m_SearchCancelButton.Visible;
        }
    }
    [WebMethod]
    public static ListingItemWithCount<Link> PageListing(int pageNumber, int pageSize, string
searchText, string sortField, bool sortDirection, Link.Filters filterList = new Link.Filters( ), int
languageID = 1)
    {
        int totalCount;
        List<Link> listItems = Link.LinkPageForAdminListingWithTotalCount((pageNumber −
1) * pageSize, pageSize, searchText, sortField, sortDirection, out totalCount, filterList,
languageID);
        return new ListingItemWithCount<Link> { Items = listItems, TotalCount = totalCount
};
    }
    [WebMethod]
    public static void DeleteRecord(int id)
    {
        Link entity = Link.GetByID(id);
        if (entity != null)
        {
            if
(File.Exists(HttpContext.Current.Server.MapPath(Classes.Links.Settings.OriginalScreenshotFold
er + entity.OriginalScreenshot)))
     File.Delete(HttpContext.Current.Server.MapPath(Classes.Links.Settings.OriginalScreensh
otFolder + entity.OriginalScreenshot));
            entity.Delete( );
        }
    }
}
```

Technical Details of Virtual Educator Manager Embodiment

The virtual educator manager employs a data structure shown in FIG. 2 at 78, with associated managers 80 and 82. These are implemented as relational tables, in the manner illustrated in connection with the lesson data structure and the page data structure. The structure includes a virtual educator table that links to a gesture table and also to a virtual educator image table. The gesture table stores each instance of a different gesture or facial expression for each of the virtual educator images managed by the system.

As with the other managers, the virtual educator manager may be implemented using an interacting combination of server side scripting code (e.g. written as active server page framework or aspx code) and under lying business logic code (e.g. written in C#). See asp code and C# code below, which shows how gestures are managed.

```
<%@ Page Language="C#" MasterPageFile="~/Admin/admin.master" AutoEventWireup="true"
Inherits="AdminGesture" CodeFile="admin-gesture.aspx.cs" %>
<asp:Content ContentPlaceHolderID="ContentWindow" runat="server">
    <%--The markup for the Header (title, breadcrumbs, and search panel) can be found in the BaseListingPage--%>
        <asp:PlaceHolder runat="server" ID="uxHeader"></asp:PlaceHolder>
        <%--The markup for pagination can be found in the BaseListingPage--%>
        <asp:PlaceHolder runat="server" ID="uxFilterPlaceHolder"></asp:PlaceHolder>
        <table class="listing" data-bind="visible: listings( ).length > 0">
            <thead>
                <tr>
                    <th class="first">
                        <a href="#" class="sort" data-bind="css:{ascending: sortField( )
== 'Name' && sortDirection( ), descending: sortField( ) == 'Name' && !sortDirection( )}, click:
function( ){listingModel.setSort('Name')}">Name</a>
                    </th>
                    <th>
                        Preview
                    </th>
                    <th>
                        <a href="#" class="sort" data-bind="css:{ascending: sortField( )
== 'Active' && sortDirection( ), descending: sortField( ) == 'Active' && !sortDirection( )}, click:
function( ){listingModel.setSort('Active')}">Active</a>
                    </th>
                    <th style="width: 120px;">
                        Options
                    </th>
                </tr>
            </thead>
            <tbody data-bind="foreach: listings">
                <tr data-bind="css:{odd:index( ) % 2 == 0}">
                    <td class="first" data-bind="html:Name">
                    </td>
                    <td>
                        <!-- ko if:Preview != '' -->
                        <img data-bind="attr:{alt:Name,src:PreviewSrc}" alt=""
src="../../img/loading.gif" />
                        <!-- /ko -->
                        <!-- ko if:Preview == '' -->
                        You have not uploaded any images for this virtual educator yet.
                        <!-- /ko -->
                    </td>
                    <td>
                        <a href='#' class="icon noText" data-bind="click: toggleActive,
css: {active: Active( ), inactive: !Active( ) }, text:activeText( ),attr:{title:activeText( )}"></a>
                    </td>
                    <td>
                        <a data-bind="attr:{href:linkToEditPage + Id +
listingModel.returnString( )}" class="icon edit">Edit</a>
                        <a href='#' class="icon delete or" data-bind="click:
function( ){if(confirm('Are you sure you want to delete this
gesture?'))deleteRecord( );}">Delete</a>
                        <input type='hidden' data-bind="value:Id" />
                    </td>
                </tr>
            </tbody>
        </table>
        <h4 class="indent paddingTop" data-bind="visible: listings( ).length == 0">There are no
Gestures to edit. Add a Gesture by clicking the Add New button above.</h4>
</asp:Content>
<asp:Content runat="server" ContentPlaceHolderID="PageSpecificJS">
    <script type="text/javascript">
        appendToListing = function (index, item, thisListing) {
            thisListing.Id = item.GestureID;
            thisListing.Name = item.Name;
            thisListing.Preview = item.Preview;
            thisListing.PreviewSrc =
"../../resizer.aspx?filename=<%=Classes.Lessons.Settings.GestureFolder.Replace("~/", "")%>" +
item.Preview + "&width=69&height=75&trim=1";
        }
    </script>
</asp:Content>
public partial class AdminGesture : BaseListingPage
{
    protected override void OnInit(EventArgs e)
    {
        //Passing control references to base class
        m_Header = uxHeader;
        m_DefaultSortField = "Name";
        m_LinkToEditPage = "admin-gesture-edit.aspx?id=";
        m_FiltersPlaceHolder = uxFilterPlaceHolder;
```

```
            m_ClassName = "Gesture";
            base.OnInit(e);
        }
        [WebMethod]
        public static ListingItemWithCount<Gesture> PageListing(int pageNumber, int pageSize,
string searchText, string sortField, bool sortDirection)
        {
            int totalCount;
            List<Gesture> listItems = Gesture.GesturePageWithTotalCount((pageNumber - 1) *
pageSize, pageSize, searchText, sortField, sortDirection, out totalCount);
            return new ListingItemWithCount<Gesture> { Items = listItems, TotalCount =
totalCount};
        }
        [WebMethod]
        public static void DeleteRecord(int id)
        {
            List<VirtualEducatorGesture> gestureImages =
VirtualEducatorGesture.VirtualEducatorGestureGetByGestureID(id);
            foreach (VirtualEducatorGesture image in gestureImages)
            {
                String imagePath =
HttpContext.Current.Server.MapPath(Settings.GestureFolder + image.Image);
                if (File.Exists(imagePath))
                    File.Delete(imagePath);
            }
            Gesture entity = Gesture.GetByID(id);
            if (entity != null)
                entity.Delete( );
        }
        [WebMethod]
        public static void ToggleActive(int id)
        {
            Gesture entity = Gesture.GetByID(id);
            if (entity != null)
            {
                entity.Active = !entity.Active;
                entity.Save( );
            }
        }
    }
}
```

Technical Details of Impact Manager Embodiment

The impact manager employs a data structure shown in FIG. 4 at 90a and 90b which includes a relational link to the barrier category manager table. These tables are implemented as relational tables, in the manner illustrated in connection with the lesson data structure and the page data structure. In addition to the basic CRUD functionality discussed above, the impact manager also includes the program code that implements the impact algorithm shown in FIG. 14. The impact algorithm may be implemented in C# within the business logic layer of the .NET framework described above.

The impact manager may likewise be implemented using an interacting combination of server side scripting code (e.g. written as active server page or asp code) and under lying business logic code (e.g. written in C#). See aspx code and C# code below, which shows how the impact manager is configured.

```
<%@ Page Language="C#" MasterPageFile="~/Admin/admin.master" AutoEventWireup="true"
CodeFile="admin-impact-manager.aspx.cs" Inherits="Admin_Impact_AdminImpactManager"
Title="Admin - Impact Manager" %>
<%@ Import Namespace="Classes.Lessons" %>
<asp:Content runat="server" ContentPlaceHolderID="PageSpecificCSS">
    <style type="text/css">
        .content.wrapper {
            width: 100%;
        }
        .whiteContent {
            padding-bottom: 0;
            top: 38px;
            border-top: 1px solid #CEDCE8;
            background: #fff url(../img/full-width-nav.png) repeat-x 0 0;
        }
        .title select {
            width: 300px;
            margin-right: 10px;
        }
        ul.breadcrumbs {
            margin: 0;
        }
        #FlashFlowchartManagerContainer {
```

```
                width: 100%;
                height: 100%;
                float: left;
            }
            div.iframeContainer {
                float: left;
                height: 100%;
            }
            #FlashFlowchartManager {
                outline: none;
            }
            .reToolbar.Default.InsertTooltip {
                background-image: url(../../images/tooltip.png);
            }
            div.smallContainer{
                width: 500px;
            }
    </style>
</asp:Content>
<asp:Content ContentPlaceHolderID="ContentWindow" runat="server">
    <div class="title">
        <h1>
            <asp:Literal runat="server" ID="uxLessonName"></asp:Literal>
            Impact Manager</h1>
        <asp:DropDownList runat="server" ID="uxTailoredDialogueState"
CssClass="floatRight" AppendDataBoundItems="true" AutoPostBack="true">
            <asp:ListItem Text="--View Impact Manager for State--"
Value=""></asp:ListItem>
        </asp:DropDownList>
        <asp:DropDownList runat="server" ID="uxSelectLesson" CssClass="floatRight"
AppendDataBoundItems="true">
            <asp:ListItem Text="--Select a Lesson--" Value=""></asp:ListItem>
        </asp:DropDownList>
        <asp:DropDownList runat="server" ID="uxSelectStageOfChange"
CssClass="floatRight" AppendDataBoundItems="true" AutoPostBack="true">
            <asp:ListItem Text="--Beginning Stage of Change--" Value=""></asp:ListItem>
        </asp:DropDownList>
        <div class="clear"></div>
    </div>
    <ul class="breadcrumbs clearfix">
        <li class="firstBreadcrumb">
            <a runat="server" href="~/admin" title="Home">Dashboard</a></li>
        <li class="currentBreadcrumb">
            <asp:Literal runat="server" ID="uxLessonName2"></asp:Literal>
            Impact Manager</li>
    </ul>
    <asp:PlaceHolder runat="server" ID="uxLessonSelectedPH" Visible="false">
        <div id="FlashFlowchartManagerContainer">
        You do not have flash enabled, this page requires flash.</div>
        <div class="iframeContainer"></div>
        <div class="clear"></div>
    </asp:PlaceHolder>
    <asp:Literal runat="server" ID="uxSelectALessonFirst" Text="<h2>Please select a lesson
first.</h2>"></asp:Literal>
</asp:Content>
<asp:Content runat="server" ContentPlaceHolderID="PageSpecificJS">
    <asp:PlaceHolder runat="server" ID="uxLessonSelectedJSPH" Visible="false">
        <asp:Literal runat= "server" ID="uxJavaScripts"
Text="~/scripts/jquery.flashembed.min.js"></asp:Literal>
        <script type="text/javascript">
            var xmlStart = '<?xml version="1.0" encoding="utf-8" ?>';
            var xml = '<%= m_FlashXML %>';
            var currentEditPageID = -1;
            var flowchartWidth = $("div#FlashFlowchartManagerContainer").width( );
            function FlashByName(movieName) {
                if (navigator.appName.indexOf("Microsoft") != -1) {
                    return window[movieName];
                } else {
                    return document[movieName];
                }
            }
            function FakeAJAXLoad( ) {
                //FAKE AJAX RESPONSE/LOAD
                Flash_UpdateXML(xmlStart + xml);
            }
            /***** FUNCTION CALLS FROM FLASH *****/
[Note: this code is an example where exchange with the Flash object and the jQuery code
occurs. The user triggers events on the page within the Flash object. The Flash calls predefined
events that trigger jQuery methods. These access the web server and make an asynchronous
```

-continued

```
call to the database.]
        function FlowchartManager_Ready( ) {
            setTimeout('FakeAJAXLoad( );', 1); //IE8 fix
            //FakeAJAXLoad( );
        }
        function RequestNewPage( ) {
            EditPage(0);
        }
        function EditPage(PageID) {
            if (PageID != currentEditPageID || PageID == 0) {
                $("div.iframeContainer").html('<iframe src="<%= BaseCode.Helpers.RootPath
%>Admin/Lessons/admin-page-edit.aspx?id=' + PageID + '&lessonID=<%=LessonID
%>&impact=true<%= !String.IsNullOrEmpty(uxTailoredDialogueState.SelectedValue) ?
"&stateID=" + uxTailoredDialogueState.SelectedValue + "&stateName=" +
uxTailoredDialogueState.SelectedItem.Text : "" %><%=
!String.IsNullOrEmpty(uxSelectStageOfChange.SelectedValue) ? "&stageID=" +
uxSelectStageOfChange.SelectedValue : "" %>" width="100%" height="100%" style="border:0px
none;"></iframe>');
                $("div.iframeContainer").width(520 + "px");
                FitWindow( );
                currentEditPageID = PageID;
            }
        }
        function SetFirstPage(PageID) {
            LessonsWebMethods.SetFirstNode(<%= LessonID %>, PageID, <%=
BaseCode.Helpers.GetCurrentLanguage( ).LanguageID %>, true, firstPage_success_method);
            function firstPage_success_method(results, userContext, methodName) {
                Flash_SetFirstPage(PageID);
            }
        }
        function ChangeAnswerLink(PageAnswerID, LinkPageID) {
            LessonsWebMethods.ChangeAnswerLink(PageAnswerID, LinkPageID,
change_success_method);
            function change_success_method(results, userContext, methodName) {
                Flash_ChangeAnswerLink(PageAnswerID, LinkPageID);
            }
        }
        /***** FUNCTION CALLS TO FLASH *****/
        function Flash_ChangeAnswerLink(PageAnswerID, LinkPageID) {
            FlashFlowchartManager.ChangeAnswerLink(PageAnswerID, LinkPageID);
        }
        function Flash_UpdateXML(value) {
            FlashFlowchartManager.UpdateXML(value);
        }
        function Flash_LockDown( ) {
            FlashFlowchartManager.LockDown( );
        }
        function Flash_SetFirstPage(PageID) {
            FlashFlowchartManager.SetFirstPage(PageID);
        }
        $(function ( ) {
            flashembed("FlashFlowchartManagerContainer", {
                id: "FlashFlowchartManager",
                name: "FlashFlowchartManager",
                src: "../lessons/FlowchartManager.swf",
                wmode: "opaque",
                allowScriptAccess: "sameDomain",
                scale: "noScale"
            }, {
                live: true,
                isAdmin: true
            });
            FlashFlowchartManager = FlashByName("FlashFlowchartManager");
            if (<%= PageID %> != 0)
                EditPage(<%= PageID %>);
        });
        function CloseIframe( ) {
            currentEditPageID = -1;
            $("div.iframeContainer").html("");
            $("div.iframeContainer").width(0);
            FitWindow( );
        }
    </script>
</asp:PlaceHolder>
<script type="text/javascript">
    var bodyBackground;
    $(document).ready(function ( ) {
        bodyBackground = $("body").css("background");
        FitWindow( );
```

```
            $(window).resize(FitWindow);
            $("#<%= uxSelectLesson.ClientID %>").change(function ( ) {
                if ($(this).val( ) != "")
                    window.location = "admin-impact-manager.aspx?lessonID=" +
$(this).val( );
            });
        });
        function FitWindow( ) {
            $("div#FlashFlowchartManagerContainer,
div.iframeContainer").height($(window).height( ));
            $("div#FlashFlowchartManagerContainer").width($(".whiteContent").width( ) −
$("div.iframeContainer").width( ));
            $('div.navWrapper').css('margin-left', ($(window).width( ) − 980) / 2 + 'px');
        }
    </script>
</asp:Content>
public partial class Admin_Impact_AdminImpactManager : Page
{
    protected string m_FlashXML;
    protected int PageID
    {
        get
        {
            int tempID;
            if (Request.QueryString["id"] != null)
                if (Int32.TryParse(Request.QueryString["id"], out tempID))
                    return tempID;
            return 0;
        }
    }
    protected int Lesson ID
    {
        get
        {
            int tempID;
            if (Request.QueryString["lessonID"] != null)
                if (Int32.TryParse(Request.QueryString["lessonID"], out tempID))
                    return tempID;
            return 0;
        }
    }
    protected override void OnInit(EventArgs e)
    {
        uxJavaScripts.Text = Helpers.GetJSCode(uxJavaScripts.Text);
        base.OnInit(e);
    }
    protected override void OnLoad(EventArgs e)
    {
        base.OnLoad(e);
        if (!IsPostBack)
        {
            uxTailoredDialogueState.DataSource =
Classes.StateAndCountry.State.StatePageWithLocalizedContent(0, 0, "", "Name", true,
Helpers.GetDefaultLanguageID( ));
            uxTailoredDialogueState.DataTextField = "Name";
            uxTailoredDialogueState.DataValueField = "StateID";
            uxTailoredDialogueState.DataBind( );
            uxSelectLesson.DataSource = Lesson.LessonPageWithLocalizedContent(0, 0,
"", "Title", true, Helpers.GetDefaultLanguageID( ));
            uxSelectLesson.DataTextField = "Title";
            uxSelectLesson.DataValueField = "LessonID";
            uxSelectLesson.DataBind( );
            uxSelectStageOfChange.DataSource = StageOfChange.GetAll( );
            uxSelectStageOfChange.DataTextField = "Stage";
            uxSelectStageOfChange.DataValueField = "StageOfChangeID";
            uxSelectStageOfChange.DataBind( );
        }
        if (LessonID > 0 && uxSelectLesson.Items.FindByValue(LessonID.ToString( )) !=
null)
        {
            uxSelectLesson.Items.FindByValue(LessonID.ToString( )).Selected = true;
            uxLessonName.Text = uxLessonName2.Text =
uxSelectLesson.Items.FindByValue(LessonID.ToString( )).Text;
            int? stageID = null;
            if (!String.IsNullOrEmpty(uxSelectStageOfChange.SelectedValue))
                stageID = Convert.ToInt32(uxSelectStageOfChange.SelectedValue);
            int? stateID = null;
            if (!String.IsNullOrEmpty(uxTailoredDialogueState.SelectedValue))
                stateID = Convert.ToInt32(uxTailoredDialogueState.SelectedValue);
```

-continued

```
        XmlDocument doc = LessonsHelpers.GetLessonXML(LessonID, stateID,
(stateID.HasValue ? uxTailoredDialogueState.SelectedItem.Text : string.Empty), true, stageID);
            if (!String.IsNullOrEmpty(doc.InnerXml))
            {
                XDocument lessonDoc = XDocument.Load(new XmlNodeReader(doc));
                m_FlashXML = lessonDoc.ToString(SaveOptions.DisableFormatting);
            }
        }
    }
        uxLessonSelectedPH.Visible = uxLessonSelectedJSPH.Visible = LessonID > 0 &&
uxSelectLesson.Items.FindByValue(LessonID.ToString( )) != null;
        uxSelectALessonFirst.Visible = !uxLessonSelectedPH.Visible;
    }
    protected override void OnPreRender(EventArgs e)
    {
        base.OnPreRender(e);
        //Register Lessons Web Service
        ScriptManager scriptManager = ScriptManager.GetCurrent(Page);
        if (scriptManager.Services.Count(s => s.Path ==
"~/Services/Lessons/LessonsWebMethods.asmx") == 0)
            scriptManager.Services.Add(new ServiceReference { InlineScript = true, Path =
"~/Services/Lessons/LessonsWebMethods.asmx" }) ;
    }
}
```

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented tool for building a backend content management system for an interactive, computer-implemented behavior change-based lesson delivery system, comprising:
   a user interface implemented by a processor programmed to receive input from a content creating user of the computer-implemented tool;
   a lesson manager implemented by the processor programmed to generate a decision tree structure and to populate that tree structure with first content in accordance with input received from the user via the user interface to define a lesson comprising a plurality of lesson pages stored in memory;
   a virtual educator manager implemented by the processor programmed to store in memory a plurality of different graphical images of an educator character, each image corresponding to a different facial expression or gesture, the virtual educator manager implemented by the processor being further programmed to respond based on input received from the user via the user interface by associating and storing in memory a selected one of the plurality of different graphical images with selected ones of said lesson pages;
   a link manager implemented by the processor programmed to store a plurality of links autonomously from the lesson, the links corresponding to second content to supplement the first content, the link manager implemented by the processor being further programmed to respond based on input received from the content creating user via the user interface to define a conditional reference between a lesson page and the second content that is programmed to test at runtime of the change-based lesson delivery system whether the referenced second content is available and to suppress the link if it is not available;
   an impact manager implemented by a processor programmed to define in memory a data structure in which to store a date when the lesson was completed by a person using the lesson delivery system and programmed to compute a predefined interval after the stored date representing a later date on which to issue a stage-of-change impact questionnaire.

2. The computer-implemented tool of claim 1 wherein the tool generates and stores content delivery system data for delivery to a backend content management system computer that uses the content delivery system data to generate an interactive web site.

3. The computer-implemented tool of claim 1 wherein the link manager implemented by the processor is further programmed to implement an algorithm-driven smart system tailoring process whereby links are selectively displayed at runtime of the lesson delivery system based on information extracted from persons using the lesson delivery system.

4. The computer-implemented tool of claim 1 wherein the link manager implemented by the processor is further programmed to implement a probabilistic model-based classifier to rank links so that they are selectively displayed at runtime of the lesson delivery system.

5. The computer-implemented tool of claim 4 wherein said classifier is a naïve Bayesian model classifier.

6. The computer-implemented tool of claim 1 wherein the link manager implemented by the processor is further programmed to implement a probabilistic model-based classifier to rank links based on user progression towards behavioral change.

7. The computer-implemented tool of claim 1 wherein the link manager implemented by the processor is further programmed to implement a Bayesian model classifier that predicts user progression towards behavioral change based on user profile aggregates representing a plurality of prior users who are similar to a current user.

8. The computer-implemented tool of claim 1 wherein the virtual educator manager includes a gesture manager implemented by the processor being further programmed to store and display different facial expressions or gestures for each of a plurality of different educator character images, providing the content creating user to select the image of a particular educator character and then use the gesture manager to select a desired facial expression or gesture to be associated with a given lesson page.

9. The computer-implemented tool of claim 1 wherein the lesson manager provides through the user interface a screen by which the content creating user defines content of individual lesson pages and defines links between pages to define said decision tree structure.

10. The computer-implemented tool of claim 1 wherein the lesson manager provides through the user interface a screen by which the content creating user associates to a given content page a specific educator character image and a specific facial expression or gesture.

11. The computer-implemented tool of claim 1 wherein the link manager defines and stores the plurality of links as content delivery system data for delivery to a backend content management system computer that includes information used by the backend content management system computer to test whether each of the plurality of links is live and to suppress expression of a link if it is not.

12. The computer implemented tool of claim 1 wherein the impact manager defines and stores as content delivery system data for delivery to a backend content management system computer information used by the backend content management system computer generate an interactive site for access by a client or consumer and to store the date on which the client or consumer completed a given lesson and upon expiration of a predetermined interval after that date to present the client or consumer with a stage-of-change impact questionnaire when the client or consumer thereafter accesses the site.

13. A computer-implemented tool for building a backend content management system for an interactive, computer-implemented behavior change-based lesson delivery system, comprising:
  a user interface implemented by a processor programmed to receive input from a content creating user of the computer-implemented tool;
  a lesson manager implemented by the processor programmed to generate a decision tree structure and to populate that tree structure with first content in accordance with input received from the user via the user interface to define a lesson comprising a plurality of lesson pages stored in memory; and
  a virtual educator manager implemented by the processor programmed to store in memory a plurality of different graphical images of an educator character, each image corresponding to a different facial expression or gesture, the virtual educator manager implemented by the processor being further programmed to respond based on input received from the user via the user interface by associating and storing in memory a selected one of the plurality of different graphical images with selected ones of said lesson pages.

14. The computer-implemented tool of claim 13 wherein the tool generates and stores content delivery system data for delivery to a backend content management system computer that uses the content delivery system data to generate an interactive web site.

15. The computer-implemented tool of claim 13 wherein the virtual educator manager includes a gesture manager implemented by the processor being further programmed to store and display different facial expressions or gestures for each of a plurality of different educator character images, providing the content creating user to select the image of a particular educator character and then use the gesture manager to select a desired facial expression or gesture to be associated with a given lesson page.

16. A computer-implemented tool for building a backend content management system for an interactive, computer-implemented behavior change-based lesson delivery system, comprising:
  a user interface implemented by a processor programmed to receive input from a content creating user of the computer-implemented tool:
  a lesson manager implemented by the processor programmed to generate a decision tree structure and to populate that tree structure with first content in accordance with input received from the user via the user interface to define a lesson comprising a plurality of lesson pages stored in memory; wherein the lesson manager provides through the user interface a screen by which the content creating user associates to a given content page a specific educator character image and a specific facial expression or gesture; and
  an impact manager implemented by a processor programmed to define in memory a data structure in which to store a date when the lesson was completed by a person using the lesson delivery system and programmed to compute a predefined interval after the stored date representing a later date on which to issue a stage-of-change impact questionnaire.

17. An interactive computer-implemented behavior change-based lesson delivery system, comprising:
  a processor programmed to serve interactive content to a user through a computer-implemented browser, the processor having associated memory and being programmed to implement the following:
  a decision tree structure in memory populated with first content to define a lesson comprising a plurality of lesson pages, the processor being programmed to cause the browser to display selected ones of the plurality of lesson pages based on browser interaction by the user;
  a virtual educator data structure in memory populated with different graphical images of an educator character, each image corresponding to a different facial expression or gesture, the processor being programmed to cause the browser to selectively display a different one of said graphical images in association based on browser interaction by the user by the user;
  a links data structure in memory populated with a plurality of links corresponding to second content to supplement the first content and defining conditional references associating selected links with selected lesson pages, the processor being programmed to permit the expression of associated links with the lesson pages if the link is determined to present live information to the browser and being programmed to suppress expression of associated links if the link is determined not to present live information to the browser;
  an impact manager data structure in memory and accessible by the processor to store a date when a lesson was completed, the processor being programmed to compute a predefined interval after the stored date and to issue a change impact questionnaire to the user if the predefined interval has expired.

* * * * *